US006665663B2

(12) United States Patent
Lindsay et al.

(10) Patent No.: US 6,665,663 B2
(45) Date of Patent: Dec. 16, 2003

(54) OUTERJOIN AND ANTIJOIN REORDERING USING EXTENDED ELIGIBILITY LISTS

(75) Inventors: Bruce Gilbert Lindsay, San Jose, CA (US); Guy Maring Lohman, San Jose, CA (US); Mir Hamid Pirahesh, San Jose, CA (US); Jun Rao, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 09/809,846

(22) Filed: Mar. 15, 2001

(65) Prior Publication Data

US 2002/0188600 A1 Dec. 12, 2002

(51) Int. Cl.$^7$ ............................................... G06F 17/30
(52) U.S. Cl. .......................................................... 707/4
(58) Field of Search ................................ 707/2, 3, 4, 5

(56) References Cited

U.S. PATENT DOCUMENTS

| 5,832,477 | A | * | 11/1998 | Bhargava et al. | 707/2 |
| 5,963,933 | A | * | 10/1999 | Cheng et al. | 707/2 |
| 5,991,754 | A | * | 11/1999 | Raitto et al. | 707/2 |
| 6,112,198 | A | * | 8/2000 | Lohman et al. | 707/3 |
| 6,438,541 | B1 | * | 8/2002 | Witkowski | 707/4 |
| 6,477,525 | B1 | * | 11/2002 | Bello et al. | 707/3 |
| 6,496,819 | B1 | * | 12/2002 | Bello et al. | 707/3 |

OTHER PUBLICATIONS

G. Bhargava et al. (1995) "Hypergraph based reorderings of outer join queries with complex predicates," In Proceedings of the ACM SIGMOD Conference, pp. 304–315.

E.F. Codd (1979) "Extending the relational database model to capture more meaning," Transactions on Database Systems, 4(4):397–434.

U. Dayal (1983) "Processing queries with quantifiers," In Proceedings of the ACM SIGACT–SIGMOD–SIGART Conference on Principles of Database Systems, pp. 125–136.

U. Dayal (1987) "Of Nests and Trees: A Unified . . . Quantifiers" Proc. 13 VLDB Conf. pp. 197–208.

C. Galindo–Legaria et al. (1992) "Algebraic optimization of outerjoin queries," PhD thesis, Dept. of Applied Science, Harvard University.

(List continued on next page.)

*Primary Examiner*—Wayne Amsbury
*Assistant Examiner*—Haythim J. Alaubaidi
(74) *Attorney, Agent, or Firm*—Gates & Cooper LLP

(57) ABSTRACT

An optimization technique that reorders outerjoins and antijoins with inner joins in a bottom-up optimizer of a relational database management system (RDBMS).

Each join predicate is associated with a normal eligibility list (NEL) that includes tables that are referenced in the join predicate and an extended eligibility list (EEL) that includes additional tables that are referenced in conflicting join predicates. An EEL includes all the tables needed by a predicate to preserve the semantics of the original query. During join enumeration, the optimizer determines whether a join predicate's EEL is a subset of all the tables in two subplans to be merged, i.e., whose EEL is covered. If so, the two subplans are combined using the join predicate. Otherwise, the two subplans cannot be joined. Two approaches are used to reordering: without compensation and with compensation. The "without compensation" approach only allows join reorderings that are valid under associative rules. Thus, the optimizer will not combine subplans using a join predicate whose EEL is not covered. The "with compensation" approach allows two subplans to be combined using the join predicate, when a join predicate's EEL is not covered, as long as the join predicate's NEL is covered. Compensation is performed through nullification and best match. Multiple compensations may be merged and performed at any time.

36 Claims, 16 Drawing Sheets

OTHER PUBLICATIONS

C. Galindo–Legaria et al. (1992) "How to extend a conventional optimizer to handle one– and two–sided outerjoin," In Proc. IEEE Int'l Conf. on Data Eng., pp. 402–409.

C. Galindo–Legaria et al. (1997) "Outerjoin simplification and reordering for query optimization," Transactions on Databse Systems, 22(1):43–73.

Won Kim, (1982) "On optimizing an SQL–like nested query," ACM Transactions on Database Systems, 7(3):443–469.

K. Ono et al. (1990) "Measuring the complexity of join enumeration in query optimization," In Proceedings of the $16^{th}$ VLDB Conference, pp. 314–325.

A. Rosenthal et al. (1990) "Query graphs implementing trees, and freely–reorderable outerjoins," In Proceedings of the ACM SIGMOD, pp. 291–299.

P.G. Selinger et al. (1979) "Access path selection in a relational database management system," In Proceedings of the ACM SIGMOD Conference, pp. 23–34.

J. Shanmugasundaram et al. (1999) "Relational databases fro querying xml documents: Limitations and opportunities," In Proceedings of the $25^{th}$ VLDB Conference.

J. Shanmugasundaram et al. (2000) "Efficiently publishing relational data as XML documents," In Proceedings of the $25^{th}$ Int'l Conference on VLDB.

* cited by examiner

| R | |
|---|---|
| tid | a |
| r1 | 1 |
| r2 | 3 |
| r3 | 5 |

| S | | |
|---|---|---|
| tid | a | b |
| s1 | 1 | 1 |
| s2 | 1 | 2 |
| s3 | 3 | 3 |
| s4 | 3 | 4 |

| T | |
|---|---|
| tid | b |
| t1 | 1 |

Fig. 4

| | | |
|---|---|---|
| r1 | s1 | t1 |
| r2 | - | - |
| r3 | - | - |

| | | |
|---|---|---|
| r1 | s1 | t1 |

(a) $R \stackrel{R.a=S.a}{\longrightarrow} (S \stackrel{S.b=T.b}{\bowtie} T)$    (b) $(R \stackrel{R.a=S.a}{\longrightarrow} S) \stackrel{S.b=T.b}{\bowtie} T$

Fig. 5

|        | preserving side           | null-producing side   |
|--------|---------------------------|-----------------------|
| outer  | { }                       | {inner, anti}         |
| anti   | {outer (pointing inward)} | {inner, outer, anti}  |
| inner  | { }                       | { }                   |

Fig. 8

| r1 | s1 | t1 |
| r1 | s2 | -  |
| r2 | s3 | -  |
| r2 | s4 | -  |
| r3 | -  | -  |

(a) $(R \stackrel{R.a=S.a}{\longrightarrow} S) \stackrel{S.b=T.b}{\longrightarrow} T$

| r1 | s1 | t1 |
| r1 | -  | -  |
| r2 | -  | -  |
| r2 | -  | -  |
| r3 | -  | -  |

(b) Nullification

| r1 | s1 | t1 |
| r2 | -  | -  |
| r3 | -  | -  |

(c) Best Match

Fig. 11

OUTERJOIN AND ANTIJOIN REORDERING USING EXTENDED ELIGIBILITY LISTS

BACKGROUND OF THE INVENTION

1. Field of the Invention

This invention relates in general to database management systems performed by computers, and in particular, to the optimization of queries that reference joins other than the standard "inner" join, specifically "outerjoins" and "antijoins."

2. Description of Related Art (Note: This application references a number of different publications as indicated throughout the specification by mnemonics enclosed in brackets, e.g., [Authorxx], wherein Author is the author's name (or abbreviation thereof) and xx is the year of publication. A list of these different publications with their associated mnemonics can be found in Section 7 entitled "References" in the "Detailed Description of the Preferred Embodiment." Each of these publications is incorporated by reference herein.)

Computer systems incorporating Relational DataBase Management System (RDBMS) software using a Structured Query Language (SQL) interface are well known in the art. The SQL interface has evolved into a standard language for RDBMS software and has been adopted as such by both the American National Standards Institute (ANSI) and the International Standards Organization (ISO).

Relational join combines information from two base tables by creating pairs of matching rows. Rows without any matches are simply discarded. These kinds of joins are referred to as inner joins. In addition to inner joins, there are two other types of joins commonly seen in relational database systems, namely outerjoins and antijoins.

Outerjoin [Codd79] is a modification of inner join that preserves all information from one or both of its arguments. Outerjoins can be further categorized into left, right (single-sided), or fall (two-sided) outerjoin, depending on which side needs to be preserved. For example, the following SQL query will return all the department names and employees within each department. For those departments without employees, the department names are listed with the employee name set to NULL.

| Example: | An outerjoin query: |
|---|---|
| SELECT | department.dname, employee.ename |
| FROM | department LEFT JOIN employee |
| | ON department.no = employee.dno |

Outerjoins are important because they are frequently used in the following applications [GR97]: (a) certain OLAP queries where we need to preserve rows from the fact table with unknown (or missing) dimensional values; (b) constructing hierarchical views that preserve objects with no children and (c) queries generated by external tools.

Recently, [STH+99] proposed a way of using relational database to handle XML queries. Outerjoins are needed to express XML paths. Outerjoins are also useful for exporting relational data into XML documents [SSB+00]. For example, to generate an XML document describing a customer from relational tables, a potential implementation will issue the following query:

| SELECT | cust.*, acct.*, porder.*, pay.*, item.* |
|---|---|
| FROM | Customer cust |
| | LEFT JOIN Account acct ON cust.id = acct.custId |
| | LEFT JOIN PurchOrder porder ON cust.id = porder.custId |
| | LEFT JOIN Item item ON porder.id = item.poId |
| | LEFT JOIN Payment pay ON porder.id = pay.poId |

Antijoin is useful for handling negated nested queries. Straightforward evaluation of those queries would require using the nested iteration method, which may be very inefficient. [Kim82] proposed to transform negated nested queries into antijoins. Since join methods other than the nested loops join could potentially be used, this transformation gives the optimizer more freedom. The following example shows such a transformation. An antijoin preserves a row from the outer table if there is no match from the inner table. Otherwise, the row is discarded. Antijoin queries occur a lot in commercial systems. For example, negated nested queries are often used to maintain referential integrity.

Example: Transform a negated nested query into an antijoin query.

Original query: list the name of all departments with no employees.
| SELECT | department.dname |
|---|---|
| FROM | department |
| WHERE | NOT EXISTS |
| | (SELECT * FROM employee |
| | WHERE department.no = employee.dno) |

After transformation:
| SELECT | department.dname |
|---|---|
| FROM | department ANTIJOIN employee |
| | ON department.no = employee.dno |

When there are only inner joins in a query, a query optimizer considers all possible join orders and selects the cheapest execution plan. Changing the order of join evaluation is a powerful optimization technique and can improve execution time by orders of magnitude. However, when outerjoins and/or antijoins are present in addition to inner joins, changing the order of evaluation is complicated. This is because these three types of joins are not always associative with each other. Two invalid transformations (verified in [RG90]) are shown below:

R LEFT JOIN (S INNER JOIN T)≠(R LEFT JOIN S) INNER JOIN T

R LEFT JOIN (S ANTIJOIN T)≠(R LEFT JOIN S) ANTIJOIN T

As a result, not all orders will give the same answer as the original query, unless special consideration is taken.

The problem of outerjoin reordering has been studied before in [RG90,GR92,BGI95,GR97], with [GR97] being the most comprehensive.

In [GR97], the authors identify a special class of query called simple join/outerjoin queries. A simple query has the property that its query graph (without specifying the join orders) unambiguously determines the semantics of the query. A conflicting set for each join predicate p is then computed through some graph analysis, which includes all join predicates that conflict with p. The information stored in the conflicting set can be used to form proper join orders in a conventional bottom-up join optimizer. Basically, when a join predicate p is used to combine two subplans, the optimizer checks if p conflicts with any join predicates used in either subplan. If so, a generalized outerjoin will be introduced to guarantee the correctness. This is described in more detail in Section 5 below.

There are two limitations in the approach used in [GR97]. First of all, it provides solutions to simple queries only. While simple queries are an important class of query, there are many real-world queries that are not simple. For example, predicates with more than one conjunct, predicates referencing more than two tables, and Cartesian products are not allowed in simple queries. This limits the application of the technique in commercial systems. As a matter of fact, many commercial database systems (e.g., Sybase IQ [Kirk99], Informix [Brown00]) either evaluate outerjoin queries in the order specified by the user or only allow limited reordering. Second, reordering with the presence of antijoins is not considered in [GR97].

The present invention proposes a new reordering approach that can handle a more general class of queries and more types of joins. This reordering is performed in a conventional bottom-up optimizer using dynamic programming [SAC+791]. Commercial systems such as DB2 [IBM99] associate with each join predicate an eligibility list. Normally, the eligibility list of a join predicate includes only those tables that are referenced in this join predicate. During the bottom-up join enumeration, the optimizer checks if there is a join predicate p whose eligibility list is a subset of all the tables in the two subplans to be merged. If so, the two subplans are combined using p. Otherwise, the two subplans cannot be joined (unless a Cartesian product is introduced).

To incorporate reordering with outerjoins and antijoins, the present invention extends the normal eligibility list. For each join predicate, an extended eligibility list (referred to as EEL) is calculated, which includes additional tables referenced in those conflicting join predicates. Intuitively, an EEL gives all the tables needed by a predicate to preserve the semantics of the original query. EELs are precomputed during one traversal of the operator tree of the original query. Such an extension is transparent to the optimizer. Instead of the normal eligibility list, the optimizer now checks the EEL for each join predicate. Although logically equivalent to the approach used in [GR97], this framework can be extended to resolve many practical issues. This is because EELs exploit the order information in the original operator tree. The query graph, on the other hand, has lost all the orders specified in the original query. Additionally, this framework (for the first time) allows reordering with the presence of antijoins.

The preferred embodiment distinguishes two kinds of approaches to the reordering problem (no previous work has explicitly done that). The first approach only allows join orders that are valid under associative rules. So, the optimizer simply refuses to combine subplans using a join predicate whose EEL is not covered. This approach is referred to as "without compensation." The second approach is more aggressive. When a join predicate p's EEL is not covered, it allows two subplans to be combined using p as long as p's normal eligibility list is covered. Some compensation work needs to be done later to correct the join result. This approach is referred to as "with compensation." The way compensation is performed is through nullification and best match. It is similar to generalized outerjoins [GR97]. However, the approach of the present invention allows multiple compensations to be merged and to be done at any time, whereas generalized outerjoins must always perform the compensation immediately. Thus, the compensation approach of the present invention considers a superset of plans of generalized outerjoins.

By distinguishing the two approaches, a framework is provided that can be smoothly incorporated into an existing system. The "without compensation" approach is relatively easy to implement and can be quickly adopted. The "with compensation" approach gives the optimizer more freedom, but takes more implementation effort. A system can consider this approach at a later time.

SUMMARY OF THE INVENTION

To overcome the limitations in the prior art described above, and to overcome other limitations that will become apparent upon reading and understanding the present specification, the present invention discloses a method, apparatus, and article of manufacture for reordering outerjoins and antijoins with inner joins in a bottom-up optimizer of a relational database management system (RDBMS).

Each join predicate is associated with a normal eligibility list (NEL) that includes tables that are referenced in the join predicate, and an extended eligibility list (EEL) that includes additional tables that are referenced in conflicting join predicates. An EEL includes all the tables needed by a predicate to preserve the semantics of the original query. An algorithm is designed to calculate the EEL of each predicate using one traversal of the original operator tree.

Two approaches are used to reordering: without compensation and with compensation. The "without compensation" approach only allows join reorderings that are valid under associative rules. Thus, the optimizer will not combine subplans using a join predicate whose EEL is not covered in the two subplans to be merged.

The "with compensation" approach allows two subplans to be combined using the join predicate, when a join predicate's EEL is not covered, as long as the join predicate's NEL is covered. Some compensation is done later to guarantee the correct result.

Compensation is performed through the operations of nullification and best match, which are defined below. Multiple compensations may be merged and performed at any time.

BRIEF DESCRIPTION OF THE DRAWINGS

Referring now to the drawings in which like reference numbers represent corresponding parts throughout:

FIG. 4 illustrates the contents of example tables R, S, and T according to the preferred embodiment of the present invention;

FIGS. 5A and 5B illustrate query results according to the preferred embodiment of the present invention;

FIG. 8 illustrates the contents of a Conflicting Matrix according to the preferred embodiment of the present invention;

FIGS. 11A, 11B, and 11C illustrate the results of reordering with compensation according to the preferred embodiment of the present invention;

DETAILED DESCRIPTION OF THE PREFERRED EMBODIMENT

Figure 1:
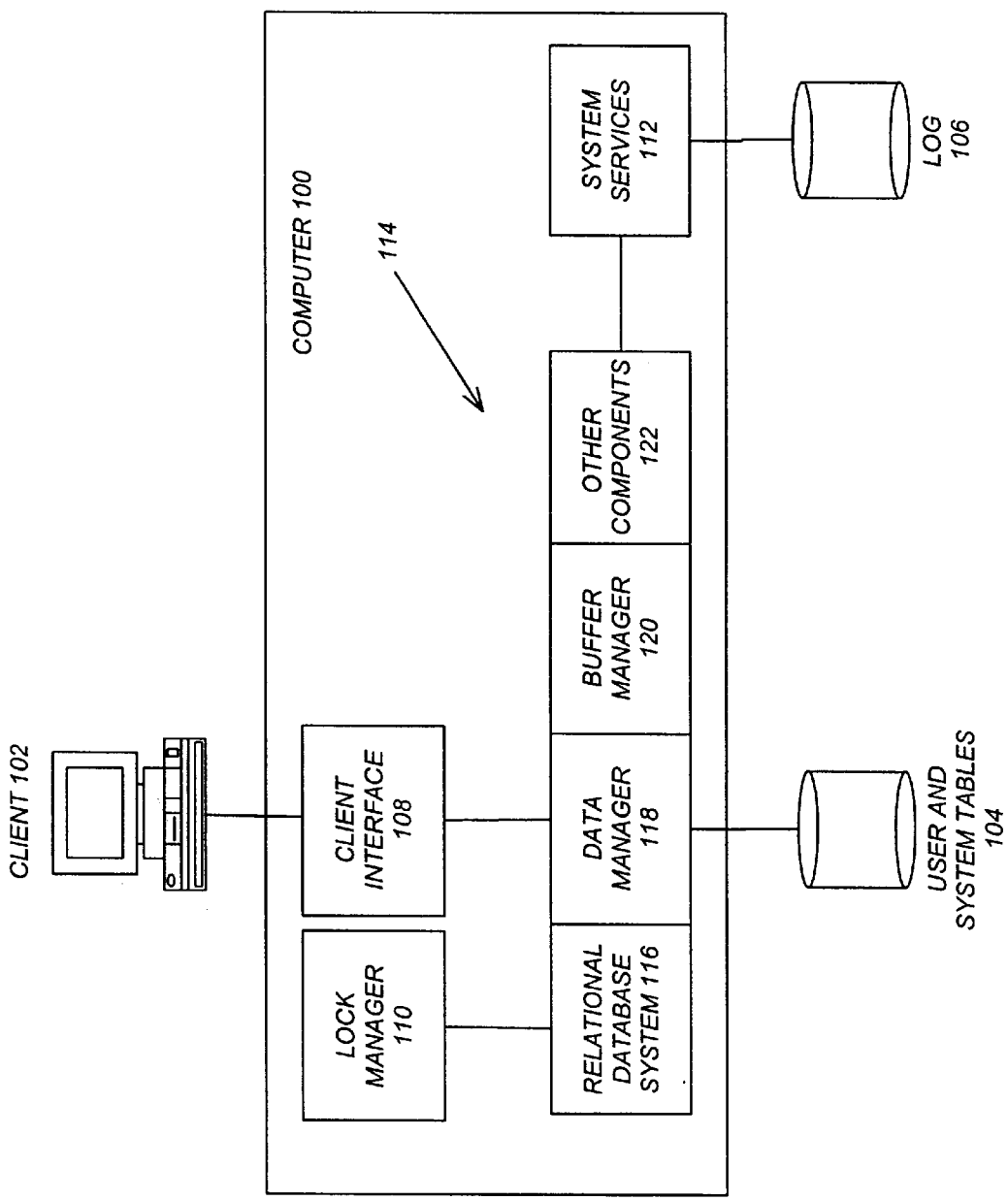
FIG. 1 illustrates the computer hardware environment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

One of the key advantages of Relational Database Management Systems (RDBMS's) is the ability to have a user submit a declarative query of what data is wanted, and to have the Query Optimizer of the RDBMS automatically determine the best sequence of operations to access and process that data. Query Optimizers typically generate many alternative "plans" for executing the query; use a mathematical model to estimate the performance of each alternative as a "cost"; and choose the plan that has the least estimated cost. Among the most important aspects that a Query Optimizer considers in evaluating different alternative plans is the order in which the tables referenced in the query are "joined" together.

Typically most join operations are of the type called "inner-joins", which can be freely reordered. Algebraically speaking, inner joins are both commutative and associative. This gives the Optimizer a great deal of flexibility and permits many possible join orderings, i.e. many alternative plans from which to choose the best.

However, queries may also contain "outerjoins" and "antijoins", which aren't commutative and are associative with other types of joins only in limited circumstances. Characterizing the necessary and sufficient circumstances under which outer-joins and anti-joins may be reordered with respect to inner-joins, and with each other, has been the subject of numerous papers in the open literature and in patents, and is the subject of this patent.

The present invention gives a simple and efficient technique for determining, for a given query, whether a candidate ordering of any of these types of joins—inner-join, outer-join, and anti-join-are legal, i.e. produce a semantically correct answer when executed, so that the Optimizer can generate as many legal alternatives as it desires and evaluate the cost of each.

It does so with an extension to existing "eligibility lists" for the predicates defining a join. The eligibility list gives the tables that must be accessed before that join can be performed. The eligibility list for each join predicate can be precomputed once for a query by analyzing the types of predicates a query has, which is represented as a graph in which the nodes are tables to be joined and the arcs are various types of joins that join those tables. The extension for outer-joins and anti-joins identifies new kinds of arcs, and an algorithm for determining the tables to be added to these "extended eligibility lists" for these new types of joins. These extended eligibility lists are then used when generating candidate plans to determine whether each candidate join ordering is legal or not, as they are considered.

The invention also extends the join methods themselves to allow join orderings that violate the above "extended eligibility lists", using a "compensation" operation to still get the semantically correct answer to the query despite that violation.

Hardware and Software Environment

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the DataBase 2 (DB2™) Universal DataBase (UDB™) product offered by IBM Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, Buffer Manager 120, and Other Components 122 such as an SQL compiler/interpreter. These submodules support the functions of the SQL language, i.e., definition, access control, retrieval, and update.

Generally, the RDBMS comprises logic and/or data that is embodied in or retrievable from a device, medium, or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

Interactive SQL Execution

Figure 2:
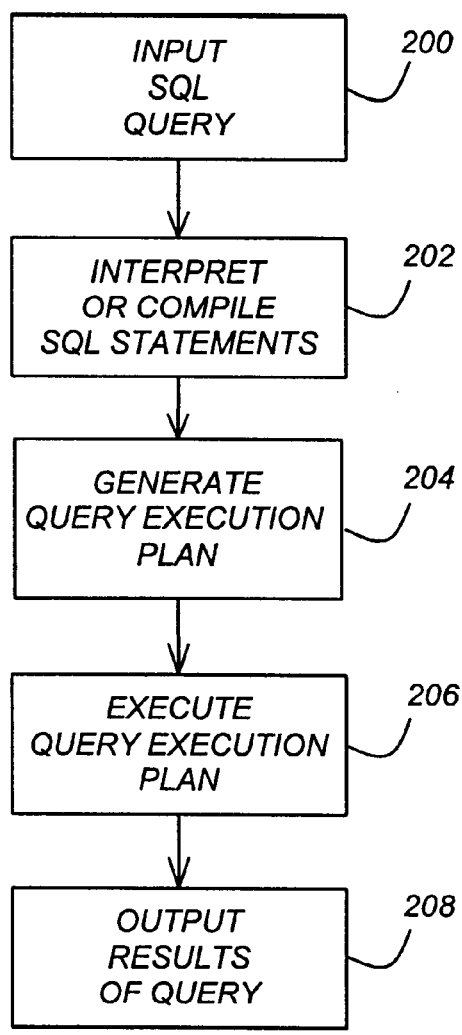
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 200 represents the input of SQL statements into the computer system 102. Block 202 represents the step of compiling or interpreting the SQL statements. Block 204 represents the step of generating a compiled set of runtime structures called a query execution plan from the compiled SQL statements. An optimization function at Block 204 may transform or optimize the SQL query in a manner described in more detail later in this specification. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 206 represents the execution of the query execution plan and Block 208 represents the output of the results.

Embedded/Batch SQL Execution

Figure 3:
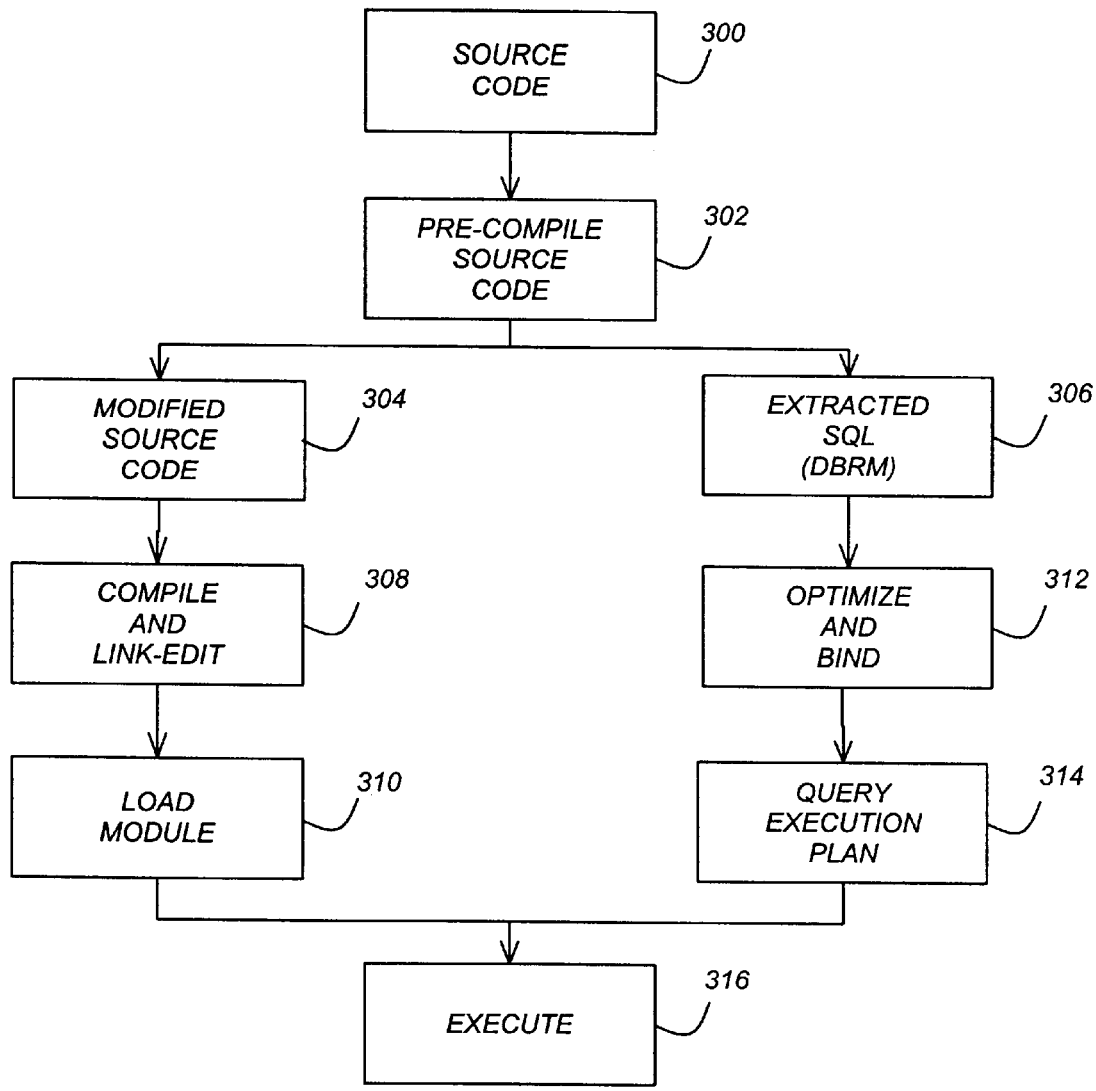
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 300 represents program source code containing a host language (such as COBOL or C) and embedded SQL statements. The program source code 300 is then input to a pre-compile step 302. There are two outputs from the pre-compile step 302: a modified source code module 304 and a Database Request Module (DBRM) 306. The modified source code module 304 contains host language calls to the RDBMS, which the pre-compile step 302 inserts in place of SQL statements. The DBRM 306 is comprised of the SQL statements from the program source code 300. A compile and link-edit step 308 uses the modified source code module 304 to produce a load module 310, while an optimize and bind step 312 uses the DBRM 306 to produce a compiled set of runtime structures for the query execution plan 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system-held statistics on the data to be accessed (the size of the table, the number of distinct values in a particular column, etc.), to choose what it considers to be the most efficient access path for the query. The load module 310 and query execution plan 314 are then executed together at step 316.

Description of the Optimization Technique

The present invention discloses an improved optimization technique that is typically performed at step 204 of FIG. 2 or step 312 of FIG. 3.

1. Introduction

Specifically, the present invention discloses an improved optimization technique that comprises an approach to reordering outerjoins and antijoins with inner joins that can handle a more general class of queries and more types of joins. This reordering is performed in a conventional bottom-up optimizer using dynamic programming.

Each join predicate is associated with an eligibility list. Normally, the eligibility list of a join predicate includes only those tables that are referenced in this join predicate. During the bottom-up join enumeration, the optimizer checks if there is a join predicate p whose eligibility list is a subset of all the tables in the two subplans to be joined. If so, the two subplans are joined using p. Otherwise, the two subplans cannot be joined (unless a Cartesian product is introduced).

To incorporate reordering with outerjoins and antijoins, the normal eligibility list is extended by this invention. For each join predicate, an extended eligibility list (EEL) is calculated, which includes additional tables referenced in those conflicting join predicates. Intuitively, an EEL gives all the tables needed by a predicate to preserve the semantics of the original query. EELs are precomputed during one traversal of the operator tree of the original query. Such an extension is easily made to the optimizer. Instead of the normal eligibility list, the optimizer now checks the EEL of the join predicates.

This framework can be extended to resolve many practical issues, because EELs can use the order information in the original operator tree. Additionally, this framework allows reordering with the presence of antijoins.

The preferred embodiment distinguishes two kinds of approaches to the reordering problem. The first approach only allows join orders that are valid under associative rules. So, the optimizer simply refuses to combine subplans using a join predicate whose EEL is not covered. This approach is referred to as "without compensation."

The second approach is more aggressive. When a join predicate p's EEL is not covered, it allows two subplans to be joined using p as long a sp's normal eligibility list is covered. Some compensation work will be done later to correct the join result. This approach is referred to as "with compensation."

The way compensation is performed is through nullification and "best match." It is similar to generalized outerjoins. However, the approach of the present invention allows multiple compensations to be merged and to be done at any time, whereas generalized outerjoins always perform the compensation immediately. Thus, the compensation approach of the present invention considers a superset of plans of generalized outerjoins.

By distinguishing the two approaches, the present invention provides a framework that can be seamlessly incorporated into an existing system. The "without compensation" approach is relatively easy to implement and can be quickly adopted. The "with compensation" approach gives the optimizer more freedom, but takes more implementation effort.

The remainder of this portion of the specification is organized as follows: Section 2 introduces the notations and assumptions. Related work is described in Section 3. Section 4 and Section 5 describe the reordering approach without compensation and with compensation, respectively. The extension needed in an optimizer is discussed in Section 6. A conclusion is provided in Section 7, references are cited in Section 8, and an Appendix describes conflicting rules and associative rules.

2 Notation and Assumptions

Definition 2.1: The inner join, denoted by $$R \overset{p_{rs}}{\bowtie} S,$$

is defined as $\{(r,s)|r \in R, s \in S$ and $p_{rs}(r,s)$ is true$\}$. The subscript in the predicate represents all the tables referenced in the predicate.

Definition 2.2: The single-sided outerjoin, denoted by $$R \overset{p_{rs}}{\longrightarrow} S,$$

is defined as $\{(r,s)|r \in R, s \in S$ and $p_{rs}(r,s)$ is true$\} \cup \{(r,\text{null}) | r \in R$ and no row of S satisfies $p_{rs}(r,s)\}$. R is referred to as the preserving side and S as the null-producing side. Of course, the single-sided outerjoin may also be denoted by $$R \overset{p_{rs}}{\longleftarrow} S,$$

which is defined in a similar although inverse manner with regard to R, r, S, and s.

Definition 2.3: The antijoin, denoted by $$R \overset{p_{rs}}{\rhd} S,$$

is defined as $\{r \in R \mid$ no row of S satisfies $p_{rs}(r,s)\}$. Again, R is referred to as the preserving side and S as the null-producing side (although the nulls from S are not in the output). Of course, the antijoin may also be denoted by $$R \overset{p_{rs}}{\lhd} S,$$

which is defined in a similar although inverse manner with regard to R, r, S, and s.

Definition 2.4: The two-sided outerjoin, denoted by $$R \overset{p_{rs}}{\longleftrightarrow} S,$$

is defined as $$\left(R \overset{p_{rs}}{\longrightarrow} S\right) \cup \left(\left(R \overset{p_{rs}}{\lhd} S\right) \times \{null\}\right).$$

Definition 2.5: A predicate p is null-intolerant if it evaluates to false whenever there is a null value in any of the attributes it references. Otherwise, the predicate is called null-tolerant. For example, (R.a=S.a) is null-intolerant while (R.a=5 or R.b=6) is null-tolerant because a null value for R.a does not necessarily disqualify that row. A Cartesian product introduces a predicate that is always true and thus is also degenerately null-tolerant.

Definition 2.6: A normal eligibility list (NEL) of a predicate p includes all the tables (referred to as TAB) that p references. The NEL is used by an optimizer to determine whether a predicate can be applied.

Definition 2.7: Predicates referencing two TABs are called binary predicates. Predicates that reference more than two TABs are called hyper-predicates. It is assumed that predicates are broken into conjuncts (which are ANDed together).

The Relational operator $\sigma_p R$ using predicate p on table R is used for selection, and the relational operator $\pi_a R$ of attribute a from table R is used for duplicate-removing projection of attribute a from table R.

Expressing an outerjoin query requires the user to specify the join order. The following query specifies that table B be joined with table C first, then with table A.

```
SELECT     *
FROM       A LEFT JOIN (B LEFT JOIN C ON B.b = C.b)
           ON A.a = B.a
```

The order of an antijoin is determined at query rewriting time. Normally, the antijoin is placed as the last join between the inner and the outer query block.

It is assumed there is only one query block after query rewriting. Queries with multiple query blocks (unrewriteable nested queries) will not change the results, since normally the optimizer will be invoked on each block individually. It is assumed that after parsing and query rewriting, an operator tree is generated for the original query. An operator tree consists of a number of binary joins (including inner join, outerjoin and antijoin) with a specific order. Although this order gives the correct result, it may not be optimal in terms of execution time. It is the optimizer's responsibility to find the optimal (valid) plan, which is also an operator tree.

Semantically, predicates in the WHERE clause should be applied after all the joins. When there are outerjoins and antijoins, local predicates cannot always be pushed down (i.e., applied before the joins) as is the case for inner joins. It is assumed these predicates are initially placed in a filter operator at the top of the original operator tree. A discussion of how to handle those predicates is provided in Section 4.3.

As has been considered in [GR97], null-intolerant predicates can simplify a query. For example, if $p_s$ is null-intolerant, the following rule holds:

$$\sigma_{p_s}\left(R \overset{p_{rs}}{\longrightarrow} S\right) = \sigma_{p_s} R \overset{p_{rs}}{\bowtie} S \tag{0}$$

Simplification is always a good thing to do since it makes operations cheaper. It is assumed all the possible simplifications have been done on the original operator tree using an algorithm described in [GR97].

Single-sided outerjoins are much more common in real world queries and can be implemented by more join methods. As a matter of fact, some commercial systems [Cor99] translate two-sided outerjoins into the union of a single-sided outerjoin and an antijoin. For the sake of simplicity, this presentation focuses on single-sided outerjoins. However, the result still holds for two-sided outerjoins.

3 Related Work

[Day83] gives some initial rules on valid evaluation orders for joins and one-sided outerjoins. [Day87] points out that one-sided outerjoin and other operators useful for nested subqueries can be implemented by minor modifications to join algorithms.

Galindo-Legaria and Rosenthal [GL92, GLR92, GLR97] have done pioneering work in the area of outerjoin simplification and reorderability. However, their work did not handle antijoin and was restricted to simple queries. A simple query assumes the following:

- all the simplifications have been done.
- all the predicates are null-intolerant.
- all outerjoin predicates have only one conjunct and are binary.

there are no Cartesian products

However, all the last three items can occur in real-world queries. In later sections, their approach is compared with the present invention in detail.

[BGI95] adapted the previous framework to deal with predicates with more than one conjunct. Basically, such a predicate is treated as a single predicate so that the conjuncts within it cannot be broken up.

4 Reordering Without Compensation

This section considers the approach without using compensation. [RG90] introduced a complete set of valid and invalid reordering rules involving outerjoins, antijoins, and inner joins. These are referred to as associative rules and conflicting rules, respectively. These rules are summarized in the Appendix. Basically, the conflicts between different types of joins are represented by extending the NEL of each predicate. Section 4.1 discusses how to set the EEL when there are outerjoins and inner joins only. Section 4.2 extends the idea to include antijoins. In both sections, it is assumed that simple queries are being dealt with and the introduction of Cartesian products is not considered. Various practical issues after loosening those restrictions are addressed in Section 4.3.

4.1 Reordering Outerjoins and Inner Joins

In contrast to inner joins, not all join orders are valid when outerjoins are involved. Consider the following more detailed example. Suppose the original query is $$R \xrightarrow{R \cdot a = S \cdot a} (S \xrightarrow{S \cdot b = T \cdot b} \triangleleft T)$$

and R, S, and T have the rows shown in the example of FIG. 4 (tid gives the unique row ID). The result of the query is shown in FIG. 5A (only the tids are shown in the result). However, evaluating the query in a different order will result in a different answer, as shown in FIG. 5B.

The reason is because an outerjoin conflicts with an inner join in its null-producing side, as specified by the following conflicting rule:

$$R \xrightarrow{p_{rs}} (S \xrightarrow{p_{st}} \triangleleft T) \neq (R \xrightarrow{p_{rs}} S) \xrightarrow{p_{st}} \triangleleft T \qquad (1)$$

By extending the normal eligibility list, this kind of conflict can be captured and the information can be provided to the optimizer.

The formal definition of the EEL is now given.

Definition 4.1: An extended eligibility list (EEL) of a predicate p includes all the tables needed in the input to p in order to get the correct answer without any compensation.

Figure 6:
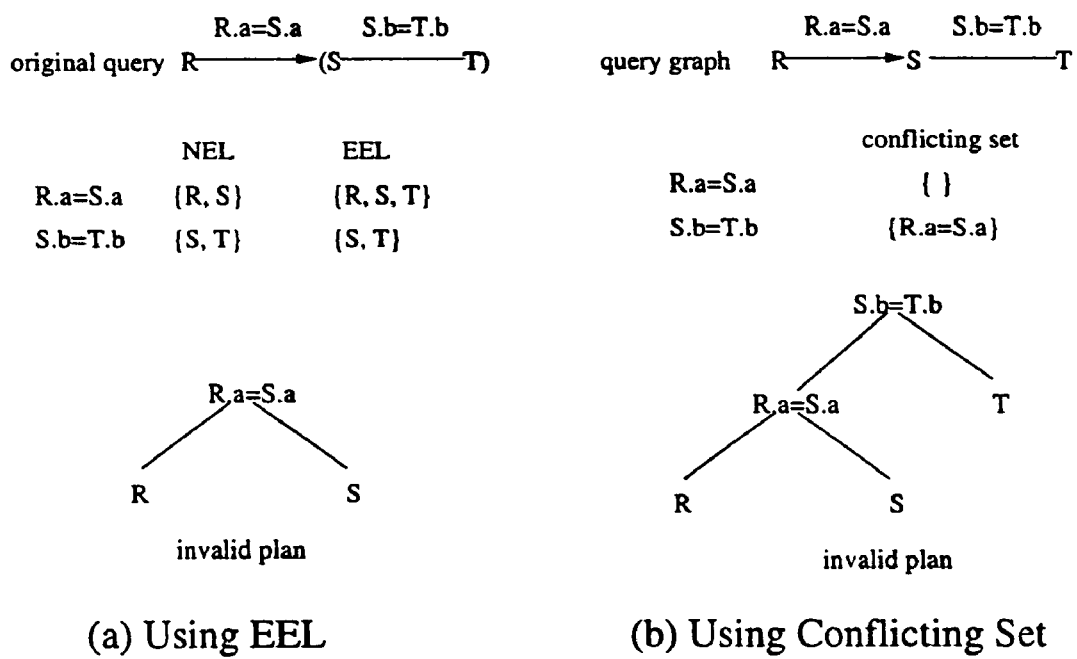
FIGS. 6A and 6B illustrate a comparison between the EEL and Conflict Set according to the preferred embodiment of the present invention.

In the above example, the EEL of predicate R.a=S.a (call it $p_{rs}$) should be set to $\{R, S, T\}$ (its NEL is $\{R, S\}$) since S and T are referenced in the conflicting inner join predicate S.b=T.b (call it $p_{st}$). The EEL of $p_{rs}$ means that in order to apply the predicate $p_{rs}$, the subplans have to include all the three tables. The EEL of the inner join predicate $p_{st}$, on the other hand, is the same as its NEL. In the "no compensation" case, where two subplans can be joined only if all the tables in the EEL of the join predicate exist in the two subplans, the optimizer will not be able to form a plan including R and S only. This is shown in FIG. 6A.

The following illustrates the approach used in [GR97]. It first generates a query graph of the original query. The query graph does not contain any information about the original join order (remember, for simple queries, the query graph uniquely identifies the query semantics). Then, a conflicting set for each predicate is computed using the query graph. A conflicting set of an inner join predicate p includes the first outerjoin predicate in a path connected to p with the arrow pointing inward. The conflicting set of an outerjoin predicate is empty when there are no two-sided outerjoins. The corresponding "without compensation" approach will prevent two subplans from being joined using predicate q if any join predicate in the two subplans is in q's conflicting set. FIG. 6B illustrates this approach.

In comparison, EELs represent the conflicts using table references, while conflicting sets represent conflicts using predicates. Although logically equivalent, there are many benefits of using the EEL's representation: (1) the idea of using the EEL can be easily extended to antijoins (discussed in Section 4.2); (2) other practical issues such as predicates with multiple conjuncts, hyper-predicates and allowing Cartesian products can also be handled efficiently using EELs (discussed in Section 4.3); (3) the computation of conflicting sets requires some graph analysis and can be complicated. On the other hand, the computation of EELs requires only one traversal of the original operator tree (as described below). Although such computation takes much less time than the evaluation of the query, the implementation of EELs will be much easier.

It turns out that when there are only outerjoins and inner joins, Rule (1) is the only conflicting rule for any query. Rule (1) means that an outerjoin can't be pushed through any inner joins on the null-producing side. Intuitively, the eligibility list of a predicate p should be extended by adding those TABs referenced in inner joins conflicting with p. Algorithm 4.1 shows how to set the EEL for each join predicate properly. During the bottom-up traversal of the original operator tree, a companion set is kept for each TAB. A companion set of a TAB T includes all the TABs that are linked to T (directly or indirectly) through inner join predicates. For each outerjoin predicate p, a TAB set S consisting of all the TABs referenced in p that are from the null-producing side of p is first collected. The TABs in the companion set of each member in S are then added to the EEL of p.

Once the EELs have been set, query plans can be generated using an "adapted" bottom-up join optimizer, which requires the EEL of each join predicate to be covered in the two subplans.

Theorem 4.2 proves the correctness of the algorithm.

Algorithm 4.1: This algorithm sets the EEL of outerjoin and inner join predicates.

Figure 7:
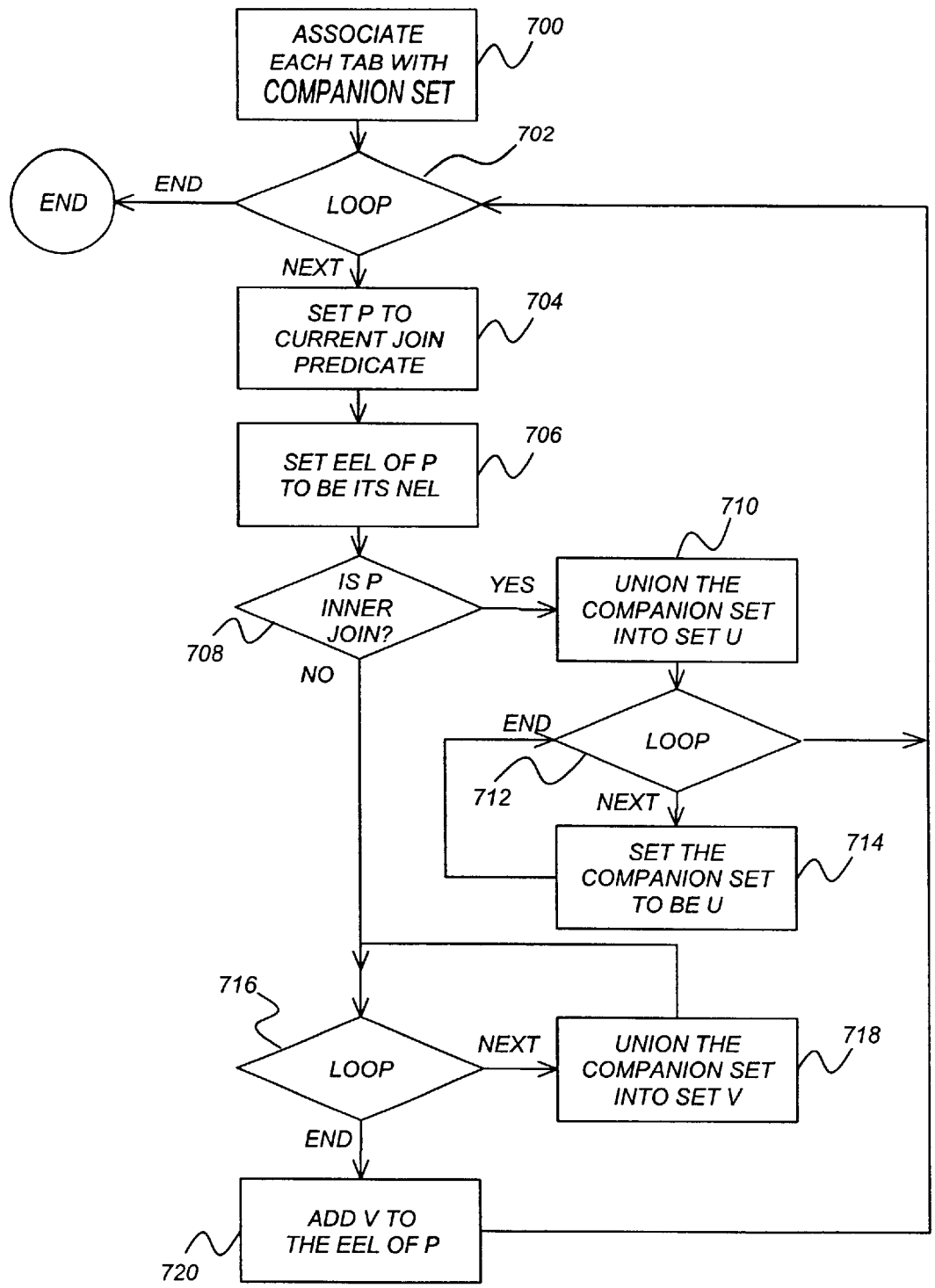
FIG. 7 is a flowchart that illustrates the steps of Algorithm 4.1, which sets the EEL of outerjoin and inner join predicates, according to the preferred embodiment of the present invention.

Referring to FIG. 7, Block 700 associates each TAB with a companion set of itself.

Block 702 represents a loop, which is performed for each join during the bottom-up traversal of the operator tree. For each iteration, control transfers to Block 704; upon completion, the logic terminates.

Block 704 sets p to the current join predicate being considered in the loop iteration.

Block 706 sets the EEL of p to be its NEL, i.e., the TABs referenced in p.

Block 708 represents a decision block that determines whether p is an inner join predicate. If so, control transfers to Block 710; otherwise, control transfers to Block 716.

Block 710 unions the companion set of all the TABs referenced in p into a set u.

Block 712 represents a loop, which is performed for each TAB in u. For each iteration, control transfers to Block 714; upon completion, control transfers to Block 702.

Block 714 sets the companion set for the TAB to be u.

Block 716 represents a loop, which is performed for all the TABs referenced in p that are from the null-producing side. For each iteration, control transfers to Block 718; upon completion, control transfers to Block 720.

Block 718 unions the companion set for the TAB into a set v.

Block 720 adds v to the EEL of p.

Thereafter, control transfers back to Block 702.

Lemma 4.1: If the EEL for each join predicate is set using Algorithm 4.1, the original operator tree can be generated by an adapted bottom-up join optimizer.

Proof. Since the EEL of a predicate p is always a subset of the TABs below p in the original operator tree, the original operator tree will satisfy all the EEL checking.

Theorem 4.2: If the EEL for each join predicate is set using Algorithm 4.1, (a) an adapted bottom-up join optimizer will generate all the possible join orders that are allowed by associative rules.

(b) all the plans generated by the adapted bottom-up join optimizer can also be obtained by transforming the original operator tree following associative rules.

Proof. (a) From Lemma 4.1, it is known that the optimizer can generate the original operator tree. If an associative rule is applied to the original operator tree, one join predicate p is pushed down. It can be shown that the EEL of p is still covered after the pushdown for each associative rule. The theorem can then be proven by induction.

(b) Suppose the optimizer generates an operator tree t' that is invalid. A sequence of transformations from the original operator tree t to t' can be found. One or more of the transformations must be invalid. The invalid transformation involves pulling an innerjoin p out of the null-producing side of an outerjoin q. However, this means that the EEL of q would have included the tables referenced in p and thus t' cannot be generated using the adapted optimizer.

The algorithm is illustrated using some examples. In Example 4.1, the two outerjoins are associative. So the EELs of the two join predicates are the same as the NELs. Thus, join order ((R,S),T) is valid. If R is much smaller than the other two tables, this join order could be much cheaper than the original order. In Example 4.2, since none of the inner joins can be evaluated before the outerjoin, the outerjoin predicate will include all four tables in its EEL.

Example 4.1

$$R \xrightarrow{Prs} (S \xrightarrow{Pst} T)$$

|  | R | S | T |
|---|---|---|---|
| companion set | {R} | {S} | {T} |
|  | NEL |  | EEL |
| $P_{rs}$ | {R, S} |  | {R, S} |
| $P_{st}$ | {S, T} |  | {S, T} |

Additional valid join order: ((R, S), T)

Example 4.2

$$R \xrightarrow{Prs} ((S \rhd^{Pst} \lhd T) \rhd^{Ptu} \lhd U)$$

|  | R | S | T | U |
|---|---|---|---|---|
| companion set | {R} | {S} | {T} | {S, T, U} |
|  | NEL |  | EEL |  |
| $P_{rs}$ | {R, S} |  | {R, S} |  |
| $P_{st}$ | {S, T} |  | {S, T} |  |
| $P_{tu}$ | {T, U} |  | {T, U} |  |

Additional valid join order: (R, (S, (T, U)))

4.2 Reordering Outerjoins, Antijoins, and Inner Joins

This section illustrates how to set the EELs properly when there are outerjoins, antijoins, and inner joins in the operator tree. Antijoins have the following additional conflicting rules:

$$R \xrightarrow{Prs} (S \overset{Pst}{\rhd} T) \neq (R \xrightarrow{Prs} S) \overset{Pst}{\rhd} T \quad (2)$$

$$R \overset{Prs}{\rhd} (S \rhd \lhd T) \neq (R \overset{Prs}{\rhd} S) \overset{Pst}{\rhd} \lhd T \quad (3)$$

$$R \overset{Prs}{\rhd} (S \xrightarrow{Pst} T) \neq (R \overset{Prs}{\rhd} S) \xrightarrow{Pst} T \quad (4)$$

$$R \overset{Prs}{\rhd} (S \overset{Pst}{\rhd} T) \neq (R \overset{Prs}{\rhd} S) \overset{Pst}{\rhd} T \quad (5)$$

$$(R \xrightarrow{Prs} S) \overset{Pst}{\rhd} T \neq R \xrightarrow{Prs} (S \overset{Pst}{\rhd} T) \quad (6)$$

Although these rules have been identified in earlier research, this is the first time they are considered together with outerjoin rules in the same framework. All of the conflicts are summarized in FIG. 8. Basically, an outerjoin conflicts with inner joins and antijoins in its null-producing side. An antijoin conflicts with all kinds of joins in the null-producing side and outerjoins "pointing" inward in the preserving side. Inner joins, on the other hand, have no conflicts.

The conflicting matrix of FIG. 8 provides the following information. For an outerjoin predicate to be eligible, all the TABs in the conflicting inner join and antijoin predicates have to be available. For an antijoin predicate to be eligible, all the TABs from the null-producing side and all the TABs in the conflicting outerjoin predicates from the preserving side have to be available. For an inner join predicate, just the TABs referenced in that predicate need to be available.

During the bottom-up traversal of the original operator tree, for each TAB t, the following is retained: (a) an outerjoin set, which contains all the TABs that are linked together through inner join or antijoin predicates, and (b) an antijoin set, which contains all the TABs that are linked to t through outerjoins pointing to t. For each outerjoin predicate p, the outerjoin set of the null-producing TAB referenced in p is added to p's EEL. For each antijoin predicate q, the antijoin set of the preserving TAB referenced in q and all the TABs in the null-producing side are added to q's EEL. Algorithm 4.2 describes the details.

Algorithm 4.2: This algorithm sets the EEL of outerjoin, antijoin, and inner join predicates.

Figure 9A:
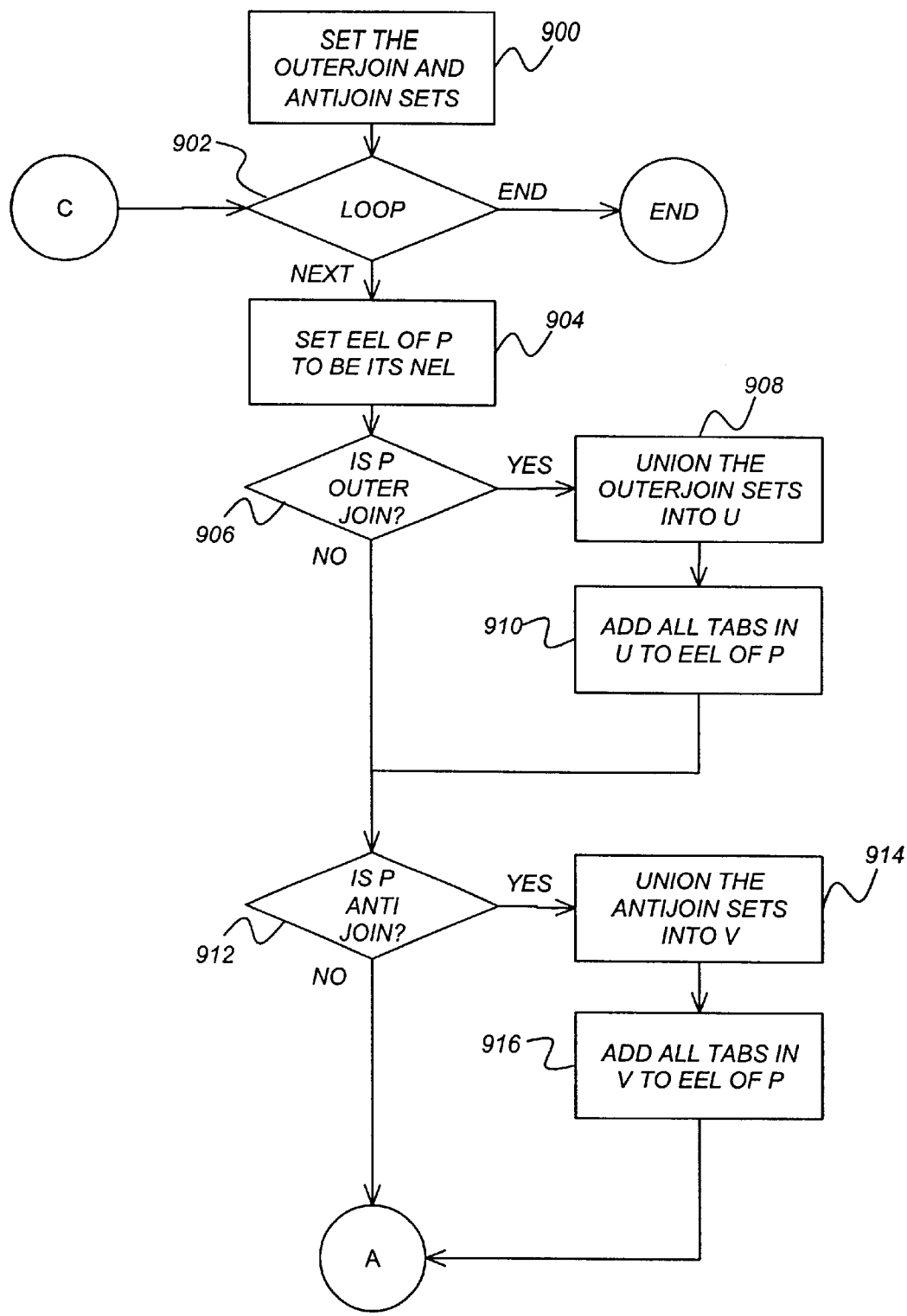
FIGS. 9A, 9B, and 9C together are a flowchart that illustrates the steps of Algorithm 4.2, which sets the EEL of outerjoin, antijoin, and inner join predicates, according to the preferred embodiment of the present invention.

Referring to FIG. 9A, Block 900 sets the outerjoin set and the antijoin set for each TAB to include itself only.

Block 902 represents a loop, which is performed for each join predicate p during the bottom-up traversal of the operator tree. For each iteration, control transfers to Block 904; upon completion, the logic terminates.

Block 904 sets the EEL of p to be its NEL.

Block 906 is a decision block that determines whether p is an outerjoin predicate. If so, control transfers to Block 908; otherwise, control transfers to Block 914.

Block 908 unions the outerjoin sets of all the TABs in p that are from the null-producing side into u.

Block 910 adds all the TABs in U to the EEL of p.

Block 912 is a decision block that determines whether p is an antijoin predicate. If so, control transfers to Block 914; otherwise, control transfers to Block 918 in FIG. 9B via "A."

Block 914 unions the antijoin sets of all the TABs referenced in p that are from the preserving side into v.

Figure 9B:
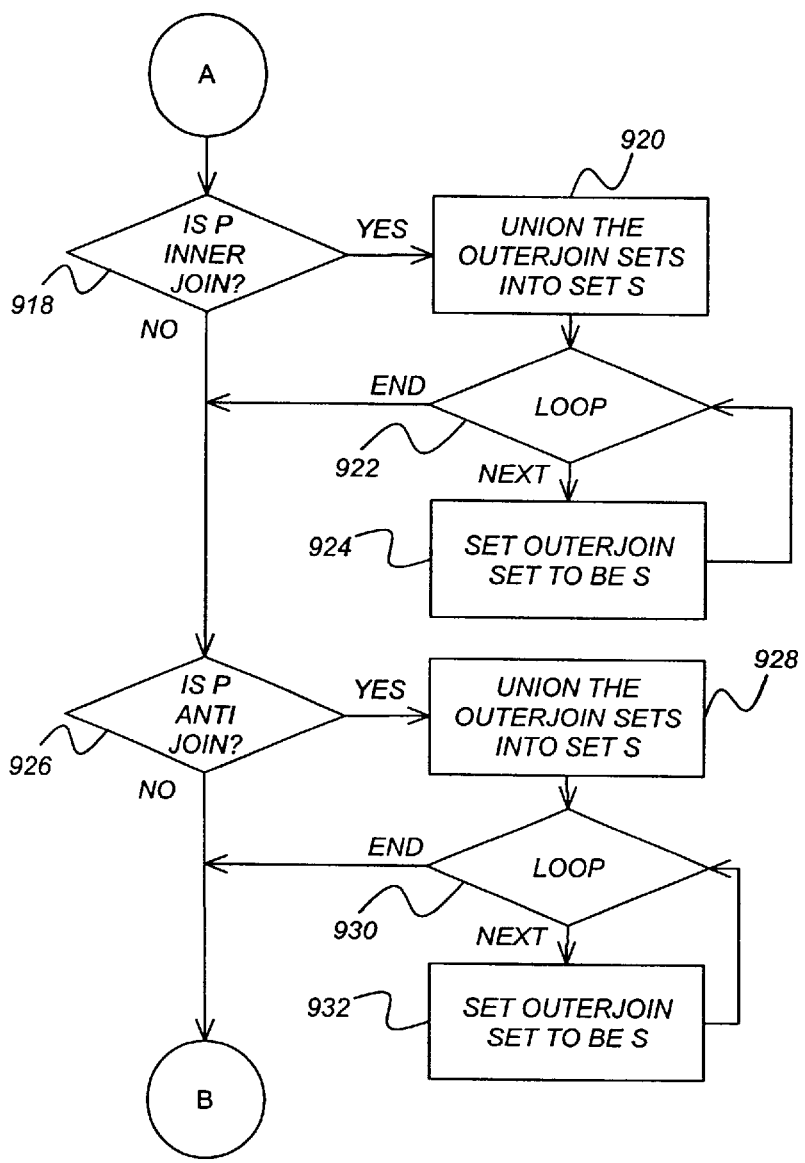

Block 916 adds all the TABs in V to the EEL of p; upon completion, control transfers to Block 918 in FIG. 9B via "A."

Referring to FIG. 9B, Block 918 is a decision block that determines whether p is an inner join predicate. If so, control transfers to Block 920; otherwise, control transfers to Block 926.

Block 920 unions the outerjoin sets of the TABs referenced in p into a new set s.

Block 922 represents a loop, which is performed for each member in s. For each iteration, control transfers to Block 924; upon completion, control transfers to Block 926.

Block 924 sets the outerjoin set for the member to be s.

Block 926 is a decision block that determines whether p is an antijoin predicate.

Figure 9C:
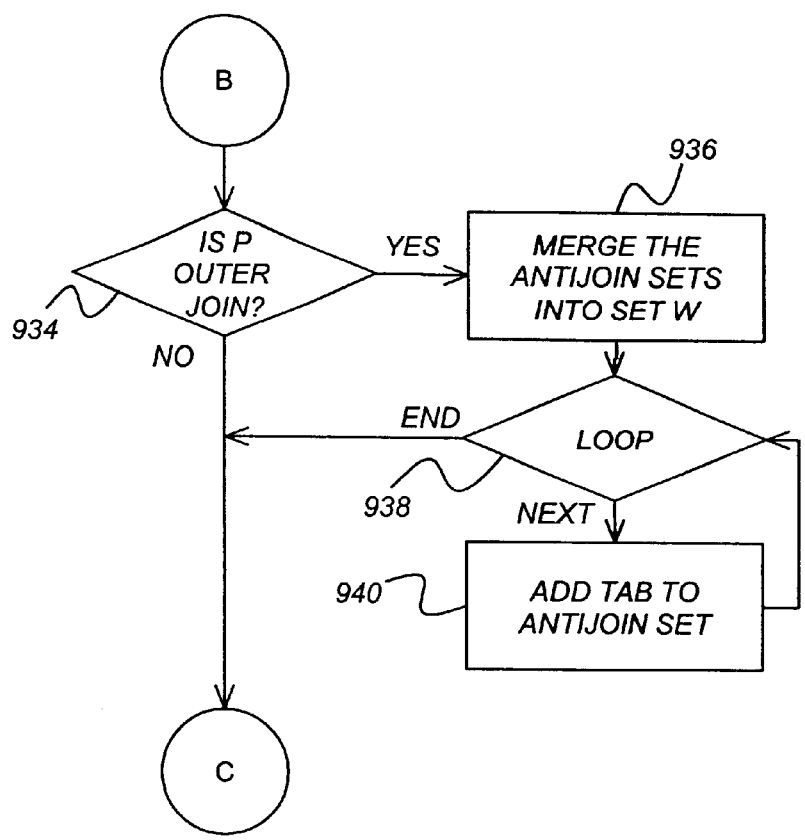

If so, control transfers to Block 928; otherwise, control transfers to Block 934 in FIG. 9C via "B."

Block 928 unions the outerjoin sets of the TABs referenced in p into a new set s.

Block 930 represents a loop, which is performed for each member in s. For each iteration, control transfers to Block 932; upon completion, control transfers to Block 934 in FIG. 9C via "B."

Block 932 sets the outerjoin set for the member to be s.

Referring to FIG. 9C, Block 934 is a decision block that determines whether p is an outerjoin predicate. If so, control transfers to Block 936; otherwise, control transfers to Block 902 in FIG. 9A via "C."

Block 936 merges the antijoin sets of all the TABs in p from the preserving side into a new set w.

Block 938 represents a loop, which is performed for each TAB t in p from the null-producing side. For each iteration, control transfers to Block 940; upon completion, control transfers to Block 902 in FIG. 9A via "C."

Block 940 adds all the TABs in w to the antijoin set of TAB t.

Thereafter, control transfers to Block 902 in FIG. 9A via "C."

The algorithm is illustrated using two examples. In Example 4.3, the antijoin set of T includes both S and T since $p_{st}$ points to T. Thus, the EEL for $p_{tu}$ is set to $\{S, T, U\}$. This means that U cannot be joined with t until S has been joined with t. On the other hand, R can be joined with S either before or after the antijoin. In Example 4.4, the EEL for predicate $p_{rs}$ is $\{R, S, T\}$, which requires table S be joined with table T before table R. The EEL for predicate $p_{uv}$ includes $\{R, T, U, V\}$ and thus $p_{uv}$ can only be applied at the end. However, the order of the two outerjoins can be switched.

Example 4.3

$$\left(\left(R \stackrel{P_{st}}{\rhd} \lhd S\right) \stackrel{P_{st}}{\longrightarrow} T\right) \stackrel{P_{tu}}{\rhd} U$$

|  | R | S | T | U |
|---|---|---|---|---|
| antijoin set | {R} | {S} | {S, T} | {U} |
| outerjoin set | {R, S} | {R, S} | {T, U} | {T, U} |

|  | NEL | EEL |
|---|---|---|
| $p_{rs}$ | {R, S} | {R, S} |
| $p_{st}$ | {S, T} | {S, T} |
| $p_{tu}$ | {T, U} | {T, U} |

Additional valid join orders: ((R, (S, T,)), U) and (R, ((S, T), U))

Example 4.4

$$\left(\left(R \stackrel{P_{rs}}{\longrightarrow} \left(S \stackrel{P_{st}}{\rhd} \lhd T\right)\right) \stackrel{P_{tu}}{\longrightarrow} U\right) \stackrel{P_{uv}}{\rhd} V$$

|  | R | S | T | U | V |
|---|---|---|---|---|---|
| outerjoin set | {R} | {S, T} | {S,T} | {U} | {V} |
| antijoin set | {R} | {R, S} | {R,T} | {R,T,U} | {V} |

|  | NEL | EEL |
|---|---|---|
| $p_{rs}$ | {R, S} | {R ,S} |
| $p_{st}$ | {S, T} | {S, T} |
| $p_{tu}$ | {T, U} | {T, U} |
| $p_{uv}$ | {U, V} | {R, T, U, V} |

Additional valid join orders: ((R, ((S, T,), U)), V)

4.3 Practical Issues

Many of the types of queries excluded at the beginning of Section 4 can arise in practice. In this section, the present invention tries to loosen these restrictions. EELs can exploit the order information in the original operator tree, and thus can be used to handle many practical issues. None of the previous work has considered all of these practical issues thoroughly.

Hyper-predicates: Predicates referencing more than two tables can occur in reality. Algorithm 4.1 and 4.2 can also handle hyper-predicates. Example 4.5 shows how the EEL of predicate $p_{rst}$ can be set up properly. To support hyper-predicates, the graph analysis used in [GLR97] would require handling hyper-edges, which would be more complicated and less intuitive.

Example 4.5

$$R \xrightarrow{Prst} \left(\left(S \rhd^{Pst}\lhd T\right) \rhd^{Ptu}\lhd U\right)$$

|  | R | S | T | U | NEL | EEL |
|---|---|---|---|---|---|---|
| companion set | {R} | {S, T, U} | {S, T, U} | {S, T, U} | $p_{st}${S, T} | {S,T} |

|  | NEL | EEL |
|---|---|---|
| $p_{rs}$ | {R, S, T} | {R, S, T, U} |
| $p_{st}$ | {S, T} | {S, T} |
| $p_{tu}$ | {T, U} | {T, U} |

Additional valid join order: none

Predicates in the Top Filter Operator: Initially, all the conjuncts in the WHERE clause are applied by the top filter operator. These predicates are either local selection predicates or inner join predicates (if they reference more than one table). When there are outerjoins or antijoins, predicates in the WHERE clause cannot always be pushed down, i.e., applied sooner. Consider the query in Example 4.6. Suppose after joining S and T, there is only one row in the join result and S.c in the result row is less than 10. Also suppose there is only one row in R and it matches the previous join result. The correct result set will be empty since the row in the join result will be filtered out by the predicate (called $p_s$) in the WHERE clause. However, if $p_s$ is applied before the left outerjoin, this results in one row with nulls in the S and T part. The reason is because $p_s$ is null-tolerant.

Example 4.6

| SELECT | * |
|---|---|
| FROM | R LEFT JOIN (S INNER JOIN t ON S.b = T.b) ON R.s = S.a |
| WHERE | (S.c > 10 OR S.c IS NULL) |

As a result, a distinction must be made between null-tolerant and null-intolerant predicates in the top filter operator. If a predicate p is null-intolerant, it can be applied as early as possible. This is because any TAB T referenced in p cannot be in the null-producing side of any outerjoin predicates (simplifiable using rule (0)) or antijoin predicates (impossible since the null-producing side is not in the output). The following rules allow predicates to be pushed into the preserving side of outerjoins or antijoins and either side of inner joins.

$$\sigma_{p_r}(R \to S) = \sigma_{p_r}(R) \to S \quad (7)$$

$$\sigma_{p_r}(R \rhd S) = \sigma_{p_r}(R) \rhd S \quad (8)$$

$$\sigma_{p_r}(R \rhd \lhd S) = \sigma_{p_r}(R) \rhd \lhd S \quad (9)$$

Thus, for null-intolerant predicates in the filter operator, their EELs are the same as their NELs.

A null-tolerant predicate q, on the other hand, cannot be pushed down arbitrarily since the TABs it references could be in the null-producing side of an outerjoin. It is only safe to evaluate q at the very end after all the joins have been performed. As a result, the EEL of a null-tolerant predicate should include all the TABs in the operator tree.

Alternatively, those null-tolerant predicates can be separated into a new query block on top of the original query block (which consists of the operator tree). This will also guarantee that those null-tolerant predicates are evaluated after the join.

Null-tolerant Join Predicates: There are two kinds of problems when join predicates are null-tolerant. First, some of the associative rules will break. For example, the following associative rule will not hold if $p_{st}$ is null-tolerant.

$$\left(R \xrightarrow{Prs} S\right) \xrightarrow{Pst} T = R \xrightarrow{Prs} \left(S \xrightarrow{Pst} T\right)$$

Second, simplification is limited. For example, the following query cannot be simplified if $p_{st}$ is null-tolerant.

$$\left(R \xrightarrow{Prs} S\right) \rhd \lhd^{Pst} T$$

As a result, it is not always safe to change the order of the evaluation of null-tolerant join predicates. So, the EEL of a null-tolerant predicate will include all the TABs from below it in the original operator tree. Similarly, those predicates can be put in separate query blocks. By doing so, the evaluation order of this particular join is fixed. However, joins below or above it may still be reorderable. A slight improvement can be made for null-tolerant inner join predicates. If there are no outerjoins or antijoins below the inner join predicate in the original operator tree, its NEL can be still used as its EEL.

Conjuncts in the Join Predicates: Join predicates specified in the ON clauses can have more than one conjunct. Although all the conjuncts can be treated as a single predicate, breaking the conjuncts may allow evaluation some of the conjuncts earlier. It is assumed here that all the conjuncts are null-intolerant (null-tolerant join predicates are handled in the above case). First, consider outerjoin predicates. If a conjunct $q_s$ is local to the null-producing side, it can be pushed down as specified by the following rule:

$$R \xrightarrow{Prs \wedge q_s} S = R \xrightarrow{Prs} (\sigma_{q_s} S) \quad (10)$$

In this case, the EEL of $q_s$ is its NEL. For each of the rest of the conjuncts (including those local to the preserving side and those referencing both sides), the EEL is set to be the union of the EELs of all the conjuncts. For example, the EEL of conjunct $p_r$ and $p_{rs}$ will both be set to {R, S, T} for query $$R \xrightarrow{Pr \wedge Prs} \overset{q_{st}}{(S \rhd\!\lhd T)}.$$

Conjuncts in an antijoin predicate can be treated in the same way as outerjoin predicates. Conjuncts in inner join predicates can always be treated separately and their EELs are the same as their NELs.

Figure 10:
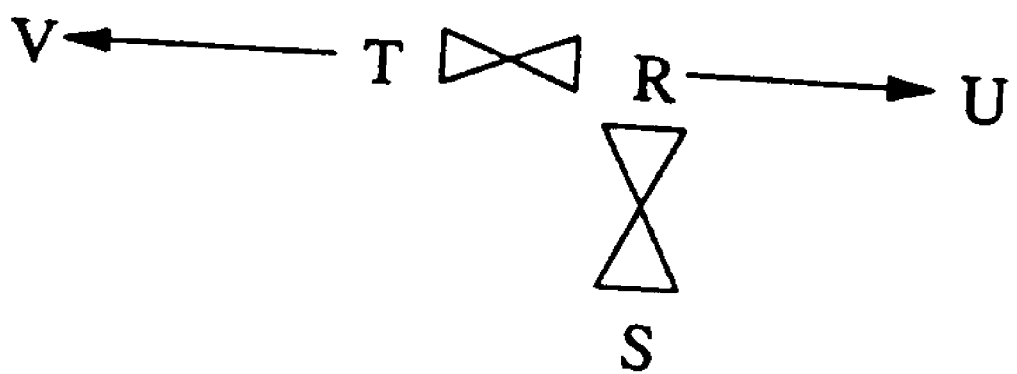
FIG. 10 illustrates an example query graph to according to the preferred embodiment of the present invention.

Introducing Cartesian Products: Although introducing Cartesian product is not a good idea in general, sometimes it can generate better plans. Consider a query $$R \overset{p_{rs}}{\rhd\!\lhd} S \overset{p_{st}}{\rhd\!\lhd} T$$

and suppose S is a fact table and R and T are dimension tables. If both R and T are small and there exists a multi-column index on S, it might be cheaper to combine R and T first using a Cartesian product, followed by an indexed nested loop join with S. Cartesian products cannot be introduced casually when there are joins other than inner joins. For example, in a query whose query graph is shown in FIG. 10 (the original order is not important since the query is freely-reorderable), a Cartesian product cannot be introduced between R and V since then it is not clear how to combine T with (R, V) (neither outerjoin nor inner join is appropriate). However, for two TABs that are connected through inner joins, a Cartesian product can be introduced between the two. In FIG. 10, a Cartesian product can be introduced between T and S. So, the rule is: a Cartesian product can be introduced on two TABs as long as they have the same companion set.

5 Reordering with Compensation

Instead of allowing only valid join orders, a more aggressive approach can be taken to allow invalid orders and later compensate the incorrect result. Consider again the query $$R \xrightarrow{R \cdot a = S \cdot a} (S \overset{S \cdot b = T \cdot b}{\rhd\!\lhd} T)$$

used in Section 4.1. Suppose both S and T are large, but R is very small. If compensation is not allowed, it forces a join of S and T first, which will probably generate a large intermediate result. On the other hand, the result size of R joining S could be much smaller. If some compensation can be done later to obtain the correct result, it may provide an overall better plan.

The Generalized Outerjoin (GOJ) proposed in [GR97] is a compensation approach. The following shows the definition of generalized outerjoin and the transformation using generalized outerjoin:

$$R \, GOJ[p, A]S = (R \overset{p}{\rhd\!\lhd} S) \cup ((\pi_A R - \pi_A(R \overset{p}{\rhd\!\lhd} S)) \times \{null\})$$

$$R \xrightarrow{Prs} (S \overset{Pst}{\rhd\!\lhd} T) = (R \xrightarrow{Prs} S) GOJ[p_{st}, R]T$$

Generalized outerjoin is an expensive operation, though, which may require two passes of the input and some additional sorting. Unfortunately, for each compensation performed during the optimization, a generalized outerjoin will be introduced. It would be nice if the number of these expensive operations can be reduced. The compensation approach taken in this invention is to evaluate a query that is less restrictive and then remove the spurious rows later.

This approach has the benefit that multiple compensation operations (which are also expensive) that would have been generated in the GOJ approach can be merged and applied only once.

Definition 5.1: Row t1 is subsumed by t2 if t1 and t2 have the same values in all the non-null fields and t2 has more non-null fields that t1. For example, row (1, –, –) is subsumed by (1, 2, –).

The compensation approach is now illustrated using query $$R \xrightarrow{R \cdot a = R \cdot a} (S \overset{S \cdot b = T \cdot b}{\rhd\!\lhd} T)$$

again. The contents of tables R, S and T are the same as shown in FIG. 4. It is known that the alternative join order $$(R \xrightarrow{R \cdot a = S \cdot a} S) \overset{S \cdot b = T \cdot b}{\rhd\!\lhd} T$$

will give an incorrect result (since all the rows with nulls in S are eliminated). To avoid losing rows, the inner join is first promoted to an outerjoin, i.e., to evaluate $$\left( R \xrightarrow{R \cdot a = S \cdot a} S \right) \xrightarrow{S \cdot b = T \cdot b} T$$

instead (result shown in FIG. 11A). Compensation is then performed in two steps. The first one is nullification, which sets to null the S part of those rows for which S.b=T. b evaluates to false (result shown in FIG. 11B). Clearly, there are now more rows than the correct result set. These are duplicated rows (e.g., the 4th row in FIG. 11B) and subsumed rows (e.g., the 2nd row in FIG. 11B). A new operator called best match is introduced to remove rows that are duplicated and subsumed. The final result after best match is shown in FIG. 11C. This provides exactly the same result as the original query.

The formal definition of nullification and best match are given in Definition 5.2 and 5.3.

Definition 5.2: A nullification operator on a set of rows S for a given predicate p and a set of attributes A is defined as Null [p, A] (S)={for each row s in S, set all the attributes in set A to null if predicate p is true}. When a table name is used for A, it is meant to nullify all the attributes coming from that table.

Definition 5.3: A best match operator BM(S) on a set of rows S is defined as BM(S)={the set of rows in S less all duplicated rows and subsumed rows}. To guarantee the correctness when using best matches, it is assumed that the tid of all the participating tables are kept during query evaluation. Best match can be implemented by hashing the inputs on one of the attributes (not nullified) and then removing duplicated and subsumed rows by sorting rows in each bucket.

Using nullification and best match, the following transformation is possible (the symbol ~is used to represent negation):

$$R \xrightarrow{P_{rs}} \left( S \overset{P_{st}}{\rhd} \lhd T \right) = BM\left(Null[\sim p_{st}, S]\left(\left(R \xrightarrow{P_{rs}} S\right) \xrightarrow{P_{st}} T\right)\right)$$

Although logically equivalent to what is done in the GOJ approach, best match has the benefit that multiple best matches can be merged. It is not difficult to verify the following rules (assuming that the tid of all the tables is kept during evaluation):

$$BM(Null[p,A](BM(R)))=BM(Null[p,A](R))$$

where A is a subset of the attributes in R, and p is a null-intolerant predicate:

$$BM(R) \triangleright \triangleleft S = BM(R \triangleright \triangleleft S)$$

$$BM(R) \rightarrow S = BM(R \rightarrow S)$$

$$BM(R) \leftarrow S = BM(R \leftarrow S)$$

Using the above rules, the following can now be derived:

$$R \xrightarrow{P_{rs}} \left( S \triangleright \overset{P_{st}}{\triangleleft} T \triangleright \overset{P_{tu}}{\triangleleft} U \right) = BM(Null[\sim p_{tu}, S \cup T](BM(Null[\sim p_{tu}, S]((R \xrightarrow{P_{rs}} S) \xrightarrow{P_{st}} T)) \xrightarrow{P_{tu}} U)) \quad (a)$$

$$= BM(Null[\sim p_{tu}, S \cup T](Null[\sim p_{tu}, S]((R \xrightarrow{P_{rs}} S) \xrightarrow{P_{st}} T)) \xrightarrow{P_{tu}} U)) \quad (b)$$

There are tradeoffs between the two plans above. Plan (a) has to perform two best matches. This plan is essentially the GOJ plan. Similar to GOJ, best match is an expensive operation. Plan (b) reduces the number of best match operations to one. On the other hand, since the compensation is delayed, spurious rows may be carried along during the evaluation, which increases the size of intermediate results. It is up to the optimizer to decide which plan to pick on a cost basis. Notice that the best match approach covers the plans considered by the generalized outerjoin. In this example, the generalized outerjoin approach does not have a corresponding plan (b).

5.1 Compensation with Outerjoins and Inner Joins Only

This section discusses how to perform compensation when there are only outerjoins and inner joins in the query. Other kinds of compensation are discussed below. For the sake of simplicity, only simple queries are considered. It is assumed that the following have been calculated using Algorithm 4.1: (a) the companion set for each TAB; (b) the NEL and the EEL for each join predicate. When no compensation is considered, the optimizer will prevent using a join predicate p if its EEL is not covered in the subplans. Now, this restriction can be loosened. If predicate p's EEL is not covered, the two subplans can still be joined as long as p's NEL is covered. However, three things need to be performed for compensation. First, those inner join predicates that need to be promoted to outerjoins need to be identified. Second, which TABs need to be nullified and how need to be determined. Lastly, when to introduce best matches must be determined.

Algorithm 5.1 presents how to generate plans with compensation. The algorithm keeps in each subplan: (a) the nullification set for each TAB T A nullification set includes a list of predicates that will be used to nullify T; and (b) a compensation set, which includes all the predicates that need to be promoted from inner join to outerjoin. Predicates in the compensation set will be treated as outerjoin predicates, and are referred to as compensation predicates. If the EEL of a predicate p is not covered (p is either an outerjoin or a compensation predicate), all the inner join predicates that are linked to the null-producing TAB in p are found. Since these inner join predicates will be evaluated after p, they have to be added to the compensation set. A compensation predicate will inherit its EEL from p. When a compensation predicate q is used to combine two subplans, its negation has to be used to nullify some TABs in the companion set of the TAB referenced in q. These TABs are those that exist in the preserving side when q is evaluated. A compensation flag is also stored in each subplan. The compensation flag is turned on as long as a compensation predicate has been applied. Adding a best match to any subplan with the compensation flag turned on may be considered at any point thereafter, and must be done at some point. However, intermediate subplans have the option to delay the compensation.

Algorithm 5.1: Combining two subplans with necessary compensation.

Figure 12A:
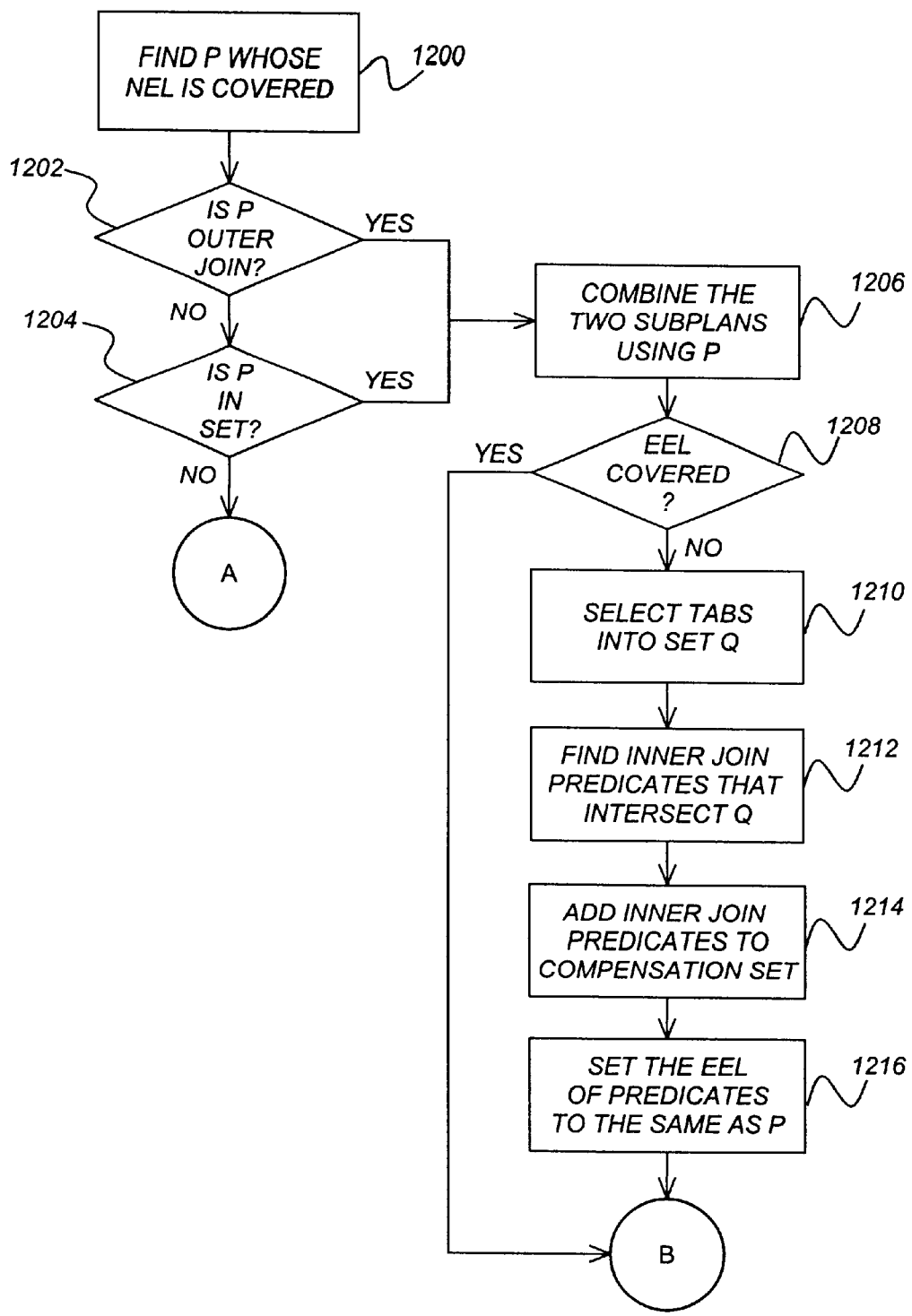
FIGS. 12A, 12B, and 12C together are a flowchart that illustrates the steps of Algorithm 5.1, which combines two subplans with necessary compensation, according to the preferred embodiment of the present invention.

Referring to FIG. 12A, Block 1200 finds a predicate p (not yet applied) whose NEL is covered by the TABs in the two subplans.

Block 1202 is a decision block that determines whether p is an outerjoin predicate. If not, control transfers to Block 1204; otherwise, control transfers to Block 1206.

Block 1204 is a decision block that determines whether p is in the compensation set of the subplans. If not, control transfers to Block 1224 in FIG. 12C via "A"; otherwise, control transfers to Block 1206.

Block 1206 combines the two subplans using p (as an outerjoin predicate).

Block 1208 is a decision block that determines whether the EEL of p is not covered by the two subplans (i.e., whether further compensation is needed). If so, control transfers to Block 1210; otherwise, control transfers to Block 1218 in FIG. 12B via "B".

Block 1210 selects into a set q those TABs in p's EEL present in the null-producing subplan (i.e., appropriate predicates are being promoted).

Block 1212 finds all inner join predicates (that have not been applied so far) whose TAB set intersects with q (but is not covered by q).

Block 1214 adds these inner join predicates to the compensation set of the combined subplan (with the TABs referenced by p being the preserving side).

Block 1216 sets the EEL of these new compensation predicates to be the same as p's.

Figure 12B:
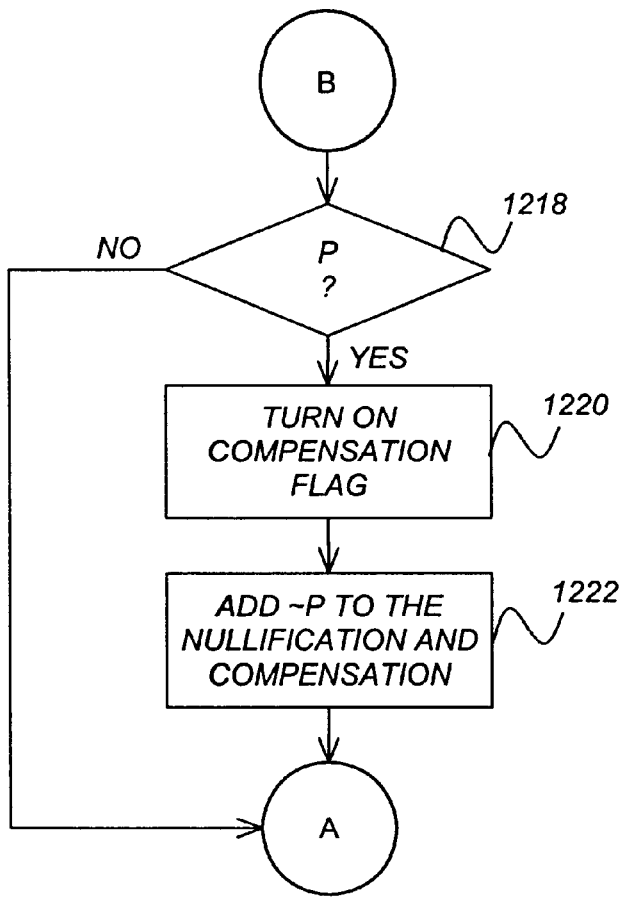

Thereafter, control transfers to Block 1218 in FIG. 12B via "B"

Referring to FIG. 12B, Block 1218 is a decision block that determines whether p is a compensation predicate. If so, control transfers to Block 1220; otherwise, control transfers to Block 1224 in FIG. 12C via "A."

Block 1220 turns on the compensation flag.

Block 1222 adds ~p to the nullification set of TABs in both the preserving subplan and the companion set of the null-producing TAB in p.

Figure 12C:
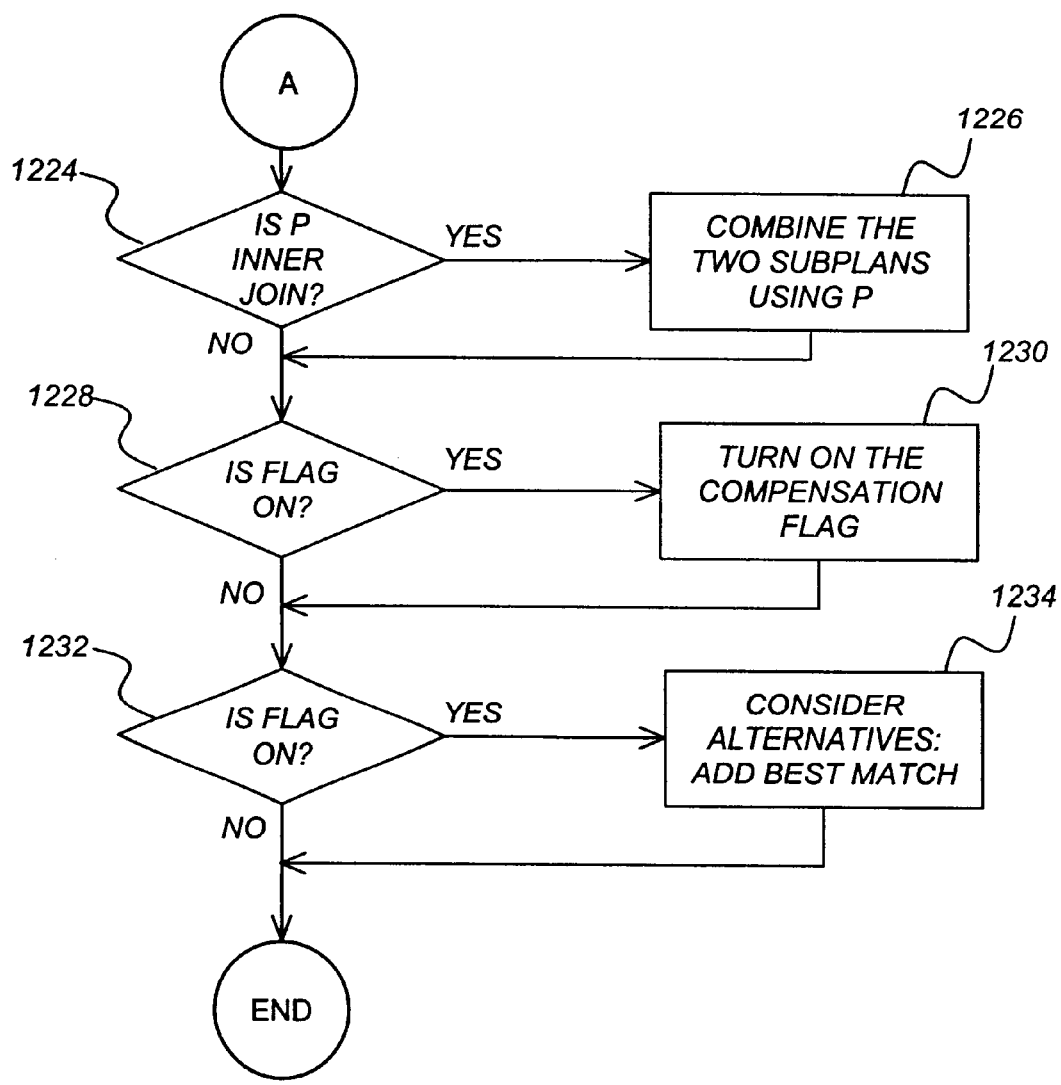

Thereafter, control transfers to Block 1224 in FIG. 12C via "A."

Referring to FIG. 12C, Block 1224 is a decision block that determines whether the predicate is an inner join predicate. If so, control transfers to Block 1226; otherwise, control transfers to Block 1228.

Block 1226 combines the two subplans using this inner join predicate.

Block 1228 is a decision block that determines whether the compensation flag of either subplan is on. If so, control transfers to Block 1230; otherwise, control transfers to Block 1232.

Block 1230 turns on the compensation flag of the combined plan.

Block 1232 is a decision block that determines whether the compensation flag is on. If so, control transfers to Block 1234; otherwise, the logic terminates.

Block 1234 considers an alternative plan by adding a best match operator

Thereafter, the logic terminates.

Figure 13:
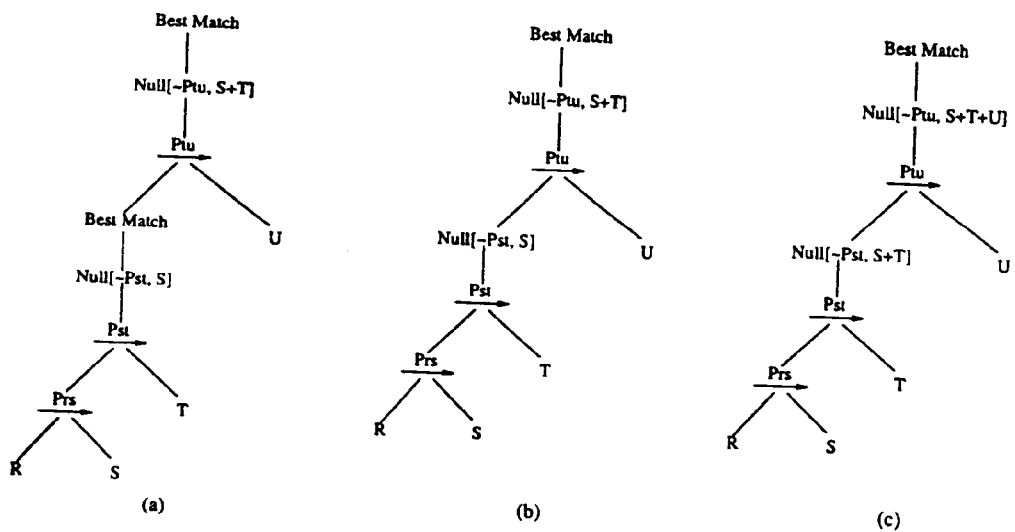
FIGS. 13A, 13B, and 13C illustrate alternative plans using best match for join order (((R(,S),T),U) according to the preferred embodiment of the present invention.

The algorithm is illustrated using Example 5.1, which describes how to generate plans corresponding to a join order that needs compensation. In the first step, the optimizer tries to combine R and S first. It turns out that the EEL of $p_{rs}$ is not covered. The only inner join predicate linking to the null-producing TAB S is $p_{st}$. So, it is added to the compensation set. In the second step, (R, S) is combined with T using predicate $p_{st}$. Since $p_{st}$ is a compensation predicate, it is used as an outerjoin predicate. Similarly, $P_{tu}$ is promoted to a compensation predicate. Also, $\sim p_{st}$ is added to the nullification set of S, since S is in both the companion set of S and the preserving side of this join. The compensation flag is turned on at this step, since a compensation predicate has been applied. Adding a best match can be considered now or at a later time. In the third step, $\sim p_{st}$ needs to be added to the nullification set of S and T. A best match has to be introduced after this step. FIGS. 13A and 13B show two alternative plans for this particular join order. In FIG. 13A, a best match is performed immediately after each compensation. In FIG. 13B, two best matches are merged and applied only once at the end. Other possible join orders using compensation are shown at the end of Example 5.1.

Example 5.1

$$R \xrightarrow{Prst} \left(\left(S \overset{Pst}{\triangleright\triangleleft} T\right) \overset{Ptu}{\triangleright\triangleleft} U\right)$$

|  | R | S | T | U |
|---|---|---|---|---|
| companion set | {R} | {S,T,U} | {S,T,U} | {S,T,U} |
|  |  | NEL |  | EEL |
| $p_{rs}$ | | {R, S, T} | | {R, S, T, U} |
| $p_{st}$ | | {S, T} | | {S, T} |
| $p_{tu}$ | | {T, U} | | {T, U} |

Steps of generating join order (((R, S), T), U).

$$R \xrightarrow{Prst} \left(\left(S \overset{Pst}{\triangleright\triangleleft} T\right) \overset{Ptu}{\triangleright\triangleleft} U\right)$$

new compensation predicates: $p_{st}$
compensation flag: off

|  | R | S |
|---|---|---|
| nullification set | { } | { } |

$$\text{Step 2 } \left(R \xrightarrow{Prs} S\right) \xrightarrow{Pst} T:$$

new compensation predicates: $p_{tu}$
compensation flag: on

|  | R | S | T |
|---|---|---|---|
| nullification set | { } | {$\sim p_{st}$} | { } |

-continued $$\text{Step 2 } \left(\left(R \xrightarrow{Prs} S\right) \xrightarrow{Pst} T\right) \xrightarrow{Ptu} U:$$

new compensation predicates: none
compensation flag: on

|  | R | S | T | U |
|---|---|---|---|---|
| nullification set | { } | {$\sim p_{tu}$} | {$\sim p_{tu}$} | { } |

Additional valid join orders:

$$BM[Null[\sim p_{st}, S]\left(\left(R \xrightarrow{Prs} S\right) \xrightarrow{Pst} \left(T \overset{Ptu}{\triangleright\triangleleft} U\right)\right)]$$

$$BM[Null[\sim p_{tu}, S \cup T]\left(\left(\left(R \xrightarrow{Prs} \left(S \overset{Pst}{\triangleright\triangleleft} T\right)\right) \xrightarrow{Ptu} U\right)\right)]$$

Storing the nullification set in each subplan can introduce plan-dependent overhead. Alternatively, the companion set of its TABs can be associated with each inner join predicate p. Then, $\sim p$ is used to nullify all the TABs in both the companion set of p and the two subplans to be merged. For example, the plan in FIG. 13(b) will change to FIG. 13(c) now. The correct result is still guaranteed, although some of the nullification is redundant. The benefit of doing this is that it avoids storing the nullification set explicitly in each subplan.

6 Extending a Conventional Query Optimizer

In this section, all the extensions needed for a conventional query optimizer to handle outerjoin and antijoin reordering using EELs are summarized. Before doing join optimization, one bottom-up traversal through the operator tree of the original query is made to set up the EEL of each predicate properly.

When using the "without compensation" approach, the only additional information that must be kept is the EEL of each predicate (if Cartesian products are allowed to be introduced, the companion set for each TAB also has to be kept). Similar to NEL, EEL is a property that is plan-independent and will not change during join enumeration. This means no additional information needs to be kept in each subplan generated by the optimizer. When combining two subplans, the optimizer checks the EEL of a join predicate instead of its NEL.

The compensation approach is more complicated. First of all, a best match operator has to be implemented. Second, a nullification set for each TAB and a compensation set has to be kept in each subplan. Both properties are plan-dependent. Since the number of plans enumerated by the optimizer can be exponential in the number of participating tables [OL90], this could introduce a non-trivial amount of storage overhead. The problem is alleviated if the nullification sets are not stored explicitly, as discussed in Section 5.1. Another slight overhead that has to be paid is to keep the TID of each participating table during the evaluation.

In comparison, reordering without compensation is easier to implement. However, it considers a more restrictive search space. The compensation approach gives the optimizer more freedom in choosing join orders, but it introduces more space overhead and requires more implementation effort. By separating the two approaches, it is possible to first adapt an optimizer to support the "without compensation" approach and later extend it to the compensation approach. It is also easy to add a switch in the optimizer to enforce a specific approach. This can be useful for developers as well as database administrators.

7 Conclusion

Outerjoins and antijoins are important types of joins in a database system. Reordering these joins together with inner joins is a challenging task. Previous work did not consider antijoin reordering and was restricted in the kind of queries it can support. As a result, many commercial systems only have limited support for outerjoin and antijoin reordering.

In the present invention, a solution is proposed that extends the eligibility list of join predicates. The solution is comprehensive in that it can handle all three types of join and support a more general class of queries. Extending the eligibility list is a powerful technique and can be used to solve many practical issues in commercial systems. The framework separates the "without compensation" and "with compensation" approach, and thus allows an existing system to seamlessly incorporate outerjoin and antijoin reordering in two phases. The compensation approach provides an optimizer with more opportunities and thus could lead to overall better plans.

8 References

The following references are incorporated by reference herein:

[BGI95] Gautam Bhargava, Piyush Goel, and Bala Iyer. Hypergraph based reorderings of outer join queries with complex predicates. In Proceedings of the ACM SIGMOD Conference, pages 304–315, 1995.

[Bro00] Paul Brown, 2000. personal communication.

[Cod79] E. F. Codd. Extending the relational database model to capture more meaning. Transactions on Database Systems, 4(4):397–434, 1979.

[Day83] Umeshwar Dayal. Processing queries with quantifiers. In Proceedings of the ACM SIGACT-SIGMOD-SIGART Conference on Principles of Database Systems, pages 125–136, 1983.

[Day87] Umeshwar Dayal. Of nests and trees: A unified approach to processing queries that contain nested subqueries, aggregates and quantifiers. In Proceedings of the 13th VLDB Conference, pages 197–208, 1987.

[GL92] Cesar A. Galindo-Legaria. Algebraic optimization of outerjoin queries. PhD thesis, Department of Applied Science, Harvard University, 1992.

[GLR92] Cesar A. Galindo-Legaria and Arnon Rosenthal. How to extend a conventional optimizer to handle one- and two-sided outerjoin. In Proc. IEEE Int'l Conf. on Data Eng., pages 402–409, 1992.

[GR97] Cesar A. Galindo-Legaria and Arnon Rosenthal. Outerjoin simplification and reordering for query optimization. Transactions on Database Systems, 22(1):43–73, 1997.

[IBM99] IBM Corporation. DB2 Universal Database Version 6.1. 1999.

[Kim82] Won Kim. On optimizing an SQL-like nested query. ACM Transactions on Database Systems, 7(3):443–469, 1982.

[Kir99] Steve Kirk, 1999 personal communication.

[OL90] Kiyoshi Ono and Guy M. Lohman. Measuring the complexity of join enumeration in query optimization. In Proceedings of the 16th VLDB Conference, pages 314–325, 1990.

[RGL90] Arnon Rosenthal and Cesar A. Galindo-Legaria. Query graphs, implementing trees, and freely-reorderable outerjoins. In Proceedings of the ACM SIGMOD Conference, pages 291–299, 1990.

[SAC+79] Patricia G. Selinger, Morton M. Astrahan, Donald D. Chamberlin, Raymond A. Lorie, and Thomas G. Price. Access path selection in a relational database management system. In Proceedings of the ACM SIGMOD Conference, pages 23–34, 1979.

[STH+99] J. Shanmugasundaram, K. Tufte, G. He, C. Zhang, D. DeWitt, and J. Naughton. Relational databases for querying xm1 documents: Limitations and opportunities. In Proceedings of the $25^{th}$ VLDB Conference, pages 302–314, 1999.

[SSB+00] J. Shanmugasundaram, E. Shekita, R. Barr, M. Carey, B. Lindsay, H.

Pirahesh, and B. Reinwald. Efficiently publishing relational data as XML documents:

Limitations and opportunities. In Proceedings of the 25th VLDB Conference, pages 302–314, 1999.

Appendix Conflicting and Associative Rules

In this section, all the predicates are assumed to be null-intolerant.

1. One-sided outerjoin
   Conflicting rules:

$$R \stackrel{Prs}{\rightarrow} \left(S \triangleright \stackrel{Pst}{\triangleleft} T\right) \neq \left(R \stackrel{Prs}{\rightarrow} S\right) \triangleright \stackrel{Pst}{\triangleleft} T$$

$$R \stackrel{Prs}{\rightarrow} \left(S \triangleright \stackrel{Pst}{\triangleleft} T\right) \neq \left(R \stackrel{Prs}{\rightarrow} S\right) \triangleright \stackrel{Pst}{\triangleleft} T$$

Associative rules:

$$\left(R \triangleright \stackrel{Prs}{\triangleleft} S\right) \stackrel{Pst}{\rightarrow} T = R \triangleright \stackrel{Prs}{\triangleleft} \left(S \stackrel{Pst}{\rightarrow} T\right)$$

$$\left(R \stackrel{Prs}{\rightarrow} S\right) \stackrel{Pst}{\rightarrow} T = R \stackrel{Prs}{\rightarrow} \left(S \stackrel{Pst}{\rightarrow} T\right)$$

$$R \stackrel{Prs}{\rightarrow} \left(S \stackrel{Pst}{\rightarrow} T\right) = \left(R \stackrel{Prs}{\rightarrow} S\right) \stackrel{Pst}{\rightarrow} T$$

$$\left(R \stackrel{Prs}{\leftarrow} S\right) \stackrel{Pst}{\rightarrow} T = R \stackrel{Prs}{\leftarrow} \left(S \stackrel{Pst}{\rightarrow} T\right)$$

$$\left(R \stackrel{Prs}{\rightarrow} S\right) \stackrel{Pst}{\rightarrow} T \text{ can be simplified}$$

$$\left(R \stackrel{Prs}{\triangleleft} S\right) \stackrel{Pst}{\rightarrow} T = R \stackrel{Prs}{\triangleleft} \left(S \stackrel{Pst}{\rightarrow} T\right)$$

$$\left(R \stackrel{Prs}{\triangleright} S\right) \stackrel{Pst}{\rightarrow} T \text{ is not allowed}$$

$$\left(R \stackrel{Prs}{\rightarrow} S\right) \stackrel{Pst}{\leftarrow} T \text{ is not allowed}$$

2. Antijoin
   Conflicting rules:

$$R \stackrel{Prs}{\triangleright} \left(S \triangleright \stackrel{Pst}{\triangleleft} T\right) \neq \left(R \stackrel{Prs}{\triangleright} S\right) \triangleright \stackrel{Pst}{\triangleleft} T$$

$$R \stackrel{Prs}{\triangleright} \left(S \stackrel{Pst}{\rightarrow} T\right) \neq \left(R \stackrel{Prs}{\triangleright} S\right) \stackrel{Pst}{\triangleright} T$$

$$\left(R \stackrel{Prs}{\rightarrow} S\right) \stackrel{Pst}{\triangleright} T \neq R \stackrel{Prs}{\rightarrow} \left(S \stackrel{Pst}{\triangleright} T\right)$$

$$R \stackrel{Prs}{\triangleright} \left(S \stackrel{Pst}{\triangleright} T\right) \neq \left(R \stackrel{Prs}{\triangleright} S\right) \triangleright \stackrel{Pst}{} T$$

Associative rules:

$$\left(R \triangleright \stackrel{Prs}{\triangleleft} S\right) \stackrel{Pst}{\triangleright} T = R \triangleright \stackrel{Prs}{\triangleleft} \left(S \stackrel{Pst}{\triangleright} T\right)$$

$$R \stackrel{Prs}{\triangleright} \left(S \stackrel{Pst}{\leftarrow} T\right) \text{ is not allowed}$$

$$\left(R \stackrel{Prs}{\leftarrow} S\right) \stackrel{Pst}{\triangleright} T = R \stackrel{Prs}{\leftarrow} \left(S \stackrel{Pst}{\triangleright} T\right)$$

$$\left(R \stackrel{Prs}{\triangleleft} S\right) \stackrel{Pst}{\triangleright} T = R \stackrel{Prs}{\rightarrow} \left(S \stackrel{Pst}{\triangleright} T\right)$$

$$\left(R \stackrel{Prs}{\triangleleft} S\right) \stackrel{Pst}{\triangleright} T \text{ is not allowed}$$

-continued $R \stackrel{Prs}{\rhd} \left(S \stackrel{Pst}{\lhd} T\right)$ is not allowed 3. Innerjoins
   No conflicting rules:
   Associative rules:

$$\left(R \stackrel{Prs}{\rhd} \lhd S\right)\rhd \stackrel{Pst}{\lhd} T = R \stackrel{Prs}{\rhd} \lhd \left(S \rhd \stackrel{Pst}{\lhd} T\right)$$

$$\left(R \stackrel{Prs}{\leftarrow} S\right) \rhd \stackrel{Pst}{\lhd} T = R \stackrel{Prs}{\leftarrow} \left(S \rhd \stackrel{Pst}{\lhd} T\right)$$

$$\left(R \stackrel{Prs}{\rightarrow} S\right) \rhd \stackrel{Pst}{\lhd} T \text{ can be simplified}$$

$$(R \stackrel{Prs}{\lhd} S) \rhd \stackrel{Pst}{\lhd} T = R \stackrel{Prs}{\lhd} \left(S \rhd \stackrel{Pst}{\lhd} T\right)$$

$$(R \stackrel{Prs}{\rhd} S) \rhd \stackrel{Pst}{\lhd} T \text{ is not allowed}$$

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any database management system could benefit from the present invention.

In summary, the present invention discloses a method, apparatus, and article of manufacture for reordering outerjoins and antijoins with inner joins in a bottom-up optimizer of a relational database management system (RDBMS).

Each join predicate is associated with a normal eligibility list (NEL) that includes tables that are referenced in the join predicate and an extended eligibility list (EEL) that includes additional tables that are referenced in conflicting join predicates. An EEL includes all the tables needed by a predicate to preserve the semantics of the original query.

During join enumeration, the optimizer determines whether a join predicate's EEL is a subset of all the tables in two subplans to be merged, i.e., its EEL is covered. If so, the two subplans are combined using the join predicate. Otherwise, the two subplans cannot be joined.

Two approaches are used to reordering: without compensation and with compensation. The "without compensation" approach only allows join reorderings that are valid under associative rules. Thus, the optimizer will not combine subplans using a join predicate whose EEL is not covered.

The "with compensation" approach allows two subplans to be combined using the join predicate, when a join predicate's EEL is not covered, as long as the join predicate's NEL is covered.

Compensation is performed through nullification and best match. Multiple compensations may be merged and performed at any time.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of performing a query in a computer system to retrieve data from a database stored on the computer system, the method comprising:

(a) generating a plurality of query execution plans (QEPs) for the query, wherein each of the QEPs includes an ordering of inner joins, outerjoins, and antijoins therein;

(b) determining whether the ordering of inner joins, outerjoins, and antijoins for each QEP produces a semantically correct answer when executed, by extending a normal eligibility list (NEL) for each join predicate in the inner joins, outerjoins, and antijoins, wherein the NEL contains all tables referenced in the join predicate and an extended eligibility list (EEL) includes additional tables that are referenced in conflicting join predicates;

(c) choosing one of the QEPs for execution to minimize an estimated cost associated therewith.

2. The method of claim 1, wherein the EEL includes all the tables needed by the join predicate to preserve the semantics of the query.

3. The method of claim 1, wherein the EELs of the join predicates for the outerjoins and the inner joins are set according to the following:

(1) associating each table in the join with a companion set of itself;

(2) for each join identified during a bottom-up traversal of an operator tree representing the query:

(2.1) setting the EEL of the join predicate to be its NEL;

(2.2) if the join predicate is an inner join predicate, then unioning the companion sets of all the tables referenced in the join predicate, and setting the companion set of each table in the unioned companion sets to the unioned companion sets; and (2.3) if the join predicate is not an inner join predicate, then unioning the companion sets of all the tables referenced in the join predicate that are from a null producing side of the join, and adding the unioned companion sets to the EEL of the join predicate.

4. The method of claim 1, wherein the EELs of the join predicates for the outerjoins, the inner joins, and the antijoins are set according to the following:

(1) setting an outerjoin set and an antijoin set for each table in the join to include only the table itself;

(2) for each join predicate identified during a bottom-up traversal of an operator tree generated from the query:

(2.1) setting the EEL of the join predicate to be its NEL;

(2.2) if the join predicate is an outerjoin predicate, then unioning the outerjoin sets of all the tables referenced in the join predicate that are from a preserving side of the join and then adding all the tables in the unioned outer join sets and all the tables from a null-producing side of the join to the EEL of the join predicate;

(2.3) if the join predicate is an inner join predicate or an antijoin predicate, then unioning the outerjoin sets of the tables referenced in the join predicate, and setting the outerjoin set for each member in the unioned outerjoin set as the unioned outerjoin set; and (2.4) if the join predicate is an outerjoin predicate, then merging the antijoin sets of all the tables referenced in the join predicate from a preserving side of the join, and for each table referenced in the join predicate from a null-producing side of the join, adding all the tables in the merged antijoin sets to the merged antijoin set.

5. The method of claim 1, wherein the determining step comprises:

determining whether the ordering of inner joins, outerjoins, and antijoins for the QEP produces the semantically correct answer when executed without using the compensation operation, wherein only valid ones of the orderings are allowed by requiring that the join predicate's EEL be covered in two subplans of the QEP.

6. The method of claim 5, wherein the determining step only allows the orderings that are valid under associative rules.

7. The method of claim 5, wherein the subplans are not combined using the join predicate whose EEL is not covered.

8. The method of claim 1, wherein the determining step comprises:

determining whether the ordering of inner joins, outerjoins, and antijoins for the QEP produces the semantically correct answer when executed using a compensation operation, even though the EEL does not include all the tables needed by the join predicates to preserve the query's semantics, wherein the compensation operation produces the semantically correct answer for the query.

9. The method of claim 8, wherein the determining step comprises:

when the join predicate's EEL is not covered, the compensation operation allows two subplans of the QEP to be combined using the join predicate as long as the join predicate's NEL is covered.

10. The method of claim 8, wherein the compensation operation is performed through nullification and best match.

11. The method of claim 8, wherein the two subplans of the QEP are combined using the compensation operation according to the following:

(1) finding a join predicate that has not been applied whose NEL is covered by the tables in the two subplans;

(2) if the join predicate is an outerjoin predicate or is in a compensation set of the subplans, then:
  (2.1) combining the two subplans using the join predicate as an outerjoin predicate;
  (2.2) if the EEL of join predicate is not covered by the two subplans, then:
    (2.2.1) selecting into a set q those tables in the join predicate's EEL that are present in a null-producing subplan;
    (2.2.2) finding all inner join predicates that have not been applied so far whose set of tables intersects with the set q but is not covered by the set q;
    (2.2.3) adding the found inner join predicates to the compensation set of the combined subplans with the tables referenced by the join predicate being a preserving side of the join;
    (2.2.4) setting the EEL of the found inner join predicates to be the same as the join predicate's EEL;
(2.3) if the join predicate is a compensation predicate, then:
  (2.3.1) adding a negative join predicate to a nullification set of the tables in both the preserving subplan and the companion set of the null-producing table in the join predicate;

(3) else if the join predicate is an inner join predicate, then:
  (3.1) combining the two subplans using the join predicate; and
  (3.2) adding a best match operator to generate an alternative QEP.

12. The method of claim 8, wherein a plurality of the compensation operations are merged.

13. A computer-implemented apparatus for performing a query, comprising:

(a) a computer system, wherein the query is performed by the computer system to retrieve data from a database stored on the computer system;

(b) logic, performed by the computer system, for:
  (1) generating a plurality of query execution plans (QEPs) for the query, wherein each of the QEPs includes an ordering of inner joins, outerjoins, and antijoins therein;
  (2) determining whether the ordering of inner joins, outerjoins, and antijoins for each QEP produces a semantically correct answer when executed, by extending a normal eligibility list (NEL) for each join predicate in the inner joins, outerjoins, and antijoins, wherein the NEL contains all tables referenced in the join predicate and an extended eligibility list (EEL) includes additional tables that are referenced in conflicting join predicates;
  (3) choosing one of the QEPs for execution to minimize an estimated cost associated therewith.

14. The apparatus of claim 13, wherein the EEL includes all the tables needed by the join predicate to preserve the semantics of the query.

15. The apparatus of claim 13, wherein the EELs of the join predicates for the outerjoins and the inner joins are set according to the following logic:

(1) associating each table in the join with a companion set of itself;

(2) for each join identified during a bottom-up traversal of an operator tree representing the query:
  (2.1) setting the EEL of the join predicate to be its NEL;
  (2.2) if the join predicate is an inner join predicate, then unioning the companion sets of all the tables referenced in the join predicate, and setting the companion set of each table in the unioned companion sets to the unioned companion sets; and
  (2.3) if the join predicate is not an inner join predicate, then unioning the companion sets of all the tables referenced in the join predicate that are from a null producing side of the join, and adding the unioned companion sets to the EEL of the join predicate.

16. The apparatus of claim 13, wherein the EELs of the join predicates for the outerjoins, the inner joins, and the antijoins are set according to the following logic:

(1) setting an outerjoin set and an antijoin set for each table in the join to include only the table itself;

(2) for each join predicate identified during a bottom-up traversal of an operator tree generated from the query:
  (2.1) setting the EEL of the join predicate to be its NEL;
  (2.2) if the join predicate is an outerjoin predicate, then unioning the outerjoin sets of all the tables referenced in the join predicate that are from a preserving side of the join and then adding all the tables in the unioned outerjoin sets and all the tables from a null-producing side of the join to the EEL of the join predicate;
  (2.3) if the join predicate is an inner join predicate or an antijoin predicate, then unioning the outerjoin sets of the tables referenced in the join predicate, and setting the outerjoin set for each member in the unioned outerjoin set as the unioned outerjoin set; and (2.4) if the join predicate is an outerjoin predicate, then merging the antijoin sets of all the tables referenced in the join predicate from a preserving side of the join, and for each table referenced in the join predicate from a null-producing side of the join, adding all the tables in the merged antijoin sets to the merged antijoin set.

17. The apparatus of claim 13, wherein the determining logic comprises logic for:

determining whether the ordering of inner joins, outerjoins, and antijoins for the QEP produces the semantically correct answer when executed without using the compensation operation, wherein only valid ones of the orderings are allowed by requiring that the join predicate's EEL be covered in two subplans of the QEP.

18. The apparatus of claim 17, wherein the determining logic only allows the orderings that are valid under associative rules.

19. The apparatus of claim 17, wherein the subplans are not combined using the join predicate whose EEL is not covered.

20. The apparatus of claim 13, wherein the determining logic comprises logic for:

determining whether the ordering of inner joins, outerjoins, and antijoins for the QEP produces the semantically correct answer when executed using a compensation operation, even though the EEL does not include all the tables needed by the join predicates to preserve the query's semantics, wherein the compensation operation produces the semantically correct answer for the query.

21. The apparatus of claim 20, wherein the determining logic comprises logic for:

when the join predicate's EEL is not covered, the compensation operation allows two subplans of the QEP to be combined using the join predicate as long as the join predicate's NEL is covered.

22. The apparatus of claim 20, wherein the compensation operation is performed through nullification and best match.

23. The apparatus of claim 20, wherein the two subplans of the QEP are combined using the compensation operation according to the following logic:

(1) finding a join predicate that has not been applied whose NEL is covered by the tables in the two subplans;

(2) if the join predicate is an outerjoin predicate or is in a compensation set of the subplans, then:

(2.1) combining the two subplans using the join predicate as an outerjoin predicate;

(2.2) if the EEL of join predicate is not covered by the two subplans, then:

(2.2.1) selecting into a set q those tables in the join predicate's EEL that are present in a null-producing subplan;

(2.2.2) finding all inner join predicates that have not been applied so far whose set of tables intersects with the set q but is not covered by the set q;

(2.2.3) adding the found inner join predicates to the compensation set of the combined subplans with the tables referenced by the join predicate being a preserving side of the join;

(2.2.4) setting the EEL of the found inner join predicates to be the same as the join predicate's EEL;

(2.3) if the join predicate is a compensation predicate, then:

(2.3.1) adding a negative join predicate to a nullification set of the tables in both the preserving subplan and the companion set of the null-producing table in the join predicate;

(3) else if the join predicate is an inner join predicate, then:

(3.1) combining the two subplans using the join predicate; and (3.2) adding a best match operator to generate an alternative QEP.

24. The apparatus of claim 20, wherein a plurality of the compensation operations are merged.

25. An article of manufacture embodying logic for performing a query in a computer system to retrieve data from a database stored in a data storage device coupled to the computer system, the logic comprising:

(a) generating a plurality of query execution plans (QEPs) for the query, wherein each of the QEPs includes an ordering of inner joins, outerjoins, and antijoins therein;

(b) determining whether the ordering of inner joins, outerjoins, and antijoins for each QEP produces a semantically correct answer when executed, by extending a normal eligibility list (NEL) for each join predicate in the inner joins, outerjoins, and antijoins, wherein the NEL contains all tables referenced in the join predicate and an extended eligibility list (EEL) includes additional tables that are referenced in conflicting join predicates;

(c) choosing one of the QEPs for execution to minimize an estimated cost associated therewith.

26. The article of manufacture of claim 25, wherein the EEL includes all the tables needed by the join predicate to preserve the semantics of the query.

27. The article of manufacture of claim 25, wherein the EELs of the join predicates for the outerjoins and the inner joins are set according to the following:

(1) associating each table in the join with a companion set of itself;

(2) for each join identified during a bottom-up traversal of an operator tree representing the query:

(2.1) setting the EEL of the join predicate to be its NEL;

(2.2) if the join predicate is an inner join predicate, then unioning the companion sets of all the tables referenced in the join predicate, and setting the companion set of each table in the unioned companion sets to the unioned companion sets; and (2.3) if the join predicate is not an inner join predicate, then unioning the companion sets of all the tables referenced in the join predicate that are from a null producing side of the join, and adding the unioned companion sets to the EEL of the join predicate.

28. The article of manufacture of claim 25, wherein the EELs of the join predicates for the outerjoins, the inner joins, and the antijoins are set according to the following:

(1) setting an outerjoin set and an antijoin set for each table in the join to include only the table itself;

(2) for each join predicate identified during a bottom-up traversal of an operator tree generated from the query:

(2.1) setting the EEL of the join predicate to be its NEL;

(2.2) if the join predicate is an outerjoin predicate, then unioning the outerjoin sets of all the tables referenced in the join predicate that are from a preserving side of the join and then adding all the tables in the unioned outerjoin sets and all the tables from a null-producing side of the join to the EEL of the join predicate;

(2.3) if the join predicate is an inner join predicate or an antijoin predicate, then unioning the outerjoin sets of the tables referenced in the join predicate, and setting the outerjoin set for each member in the unioned outerjoin set as the unioned outerjoin set; and (2.4) if the join predicate is an outerjoin predicate, then merging the antijoin sets of all the tables referenced in the join predicate from a preserving side of the join, and for each table referenced in the join predicate from a null-producing side of the join, adding all the tables in the merged antijoin sets to the merged antijoin set.

29. The article of manufacture of claim 25, wherein the determining step comprises:

determining whether the ordering of inner joins, outerjoins, and antijoins for the QEP produces the semantically correct answer when executed without using the compensation operation, wherein only valid ones of the orderings are allowed by requiring that the join predicate's EEL be covered in two subplans of the QEP.

30. The article of manufacture of claim 29, wherein the determining step only allows the orderings that are valid under associative rules.

31. The article of manufacture of claim 29, wherein the subplans are not combined using the join predicate whose EEL is not covered.

32. The article of manufacture of claim 25, wherein the determining step comprises:

determining whether the ordering of inner joins, outerjoins, and antijoins for the QEP produces the semantically correct answer when executed using a compensation operation, even though the EEL does not include all the tables needed by the join predicates to preserve the query's semantics, wherein the compensation operation produces the semantically correct answer for the query.

33. The article of manufacture of claim 32, wherein the determining step comprises:

when the join predicate's EEL is not covered, the compensation operation allows two subplans of the QEP to be combined using the join predicate as long as the join predicate's NEL is covered.

34. The article of manufacture of claim 32, wherein the compensation operation is performed through nullification and best match.

35. The article of manufacture of claim 32, wherein the two subplans of the QEP are combined using the compensation operation according to the following:

(1) finding a join predicate that has not been applied whose NEL is covered by the tables in the two subplans;

(2) if the join predicate is an outerjoin predicate or is in a compensation set of the subplans, then:

(2.1) combining the two subplans using the join predicate as an outerjoin predicate;

(2.2) if the EEL of join predicate is not covered by the two subplans, then:

(2.2.1) selecting into a set q those tables in the join predicate's EEL that are present in a null-producing subplan;

(2.2.2) finding all inner join predicates that have not been applied so far whose set of tables intersects with the set q but is not covered by the set q;

(2.2.3) adding the found inner join predicates to the compensation set of the combined subplans with the tables referenced by the join predicate being a preserving side of the join;

(2.2.4) setting the EEL of the found inner join predicates to be the same as the join predicate's EEL;

(2.3) if the join predicate is a compensation predicate, then:

(2.3.1) adding a negative join predicate to a nullification set of the tables in both the preserving subplan and the companion set of the null-producing table in the join predicate;

(3) else if the join predicate is an inner join predicate, then:

(3.1) combining the two subplans using the join predicate; and (3.2) adding a best match operator to generate an alternative QEP.

36. The article of manufacture of claim 32, wherein a plurality of the compensation operations are merged.

* * * * *